Oct. 4, 1927. 1,644,384
I. H. KENDALL
APPARATUS FOR CLEANSING MILK CANS AND OTHER RECEPTACLES
Filed April 11, 1922 18 Sheets-Sheet 1

Oct. 4, 1927. 1,644,384
I. H. KENDALL
APPARATUS FOR CLEANSING MILK CANS AND OTHER RECEPTACLES
Filed April 11, 1922   18 Sheets-Sheet 5

Fig.5.

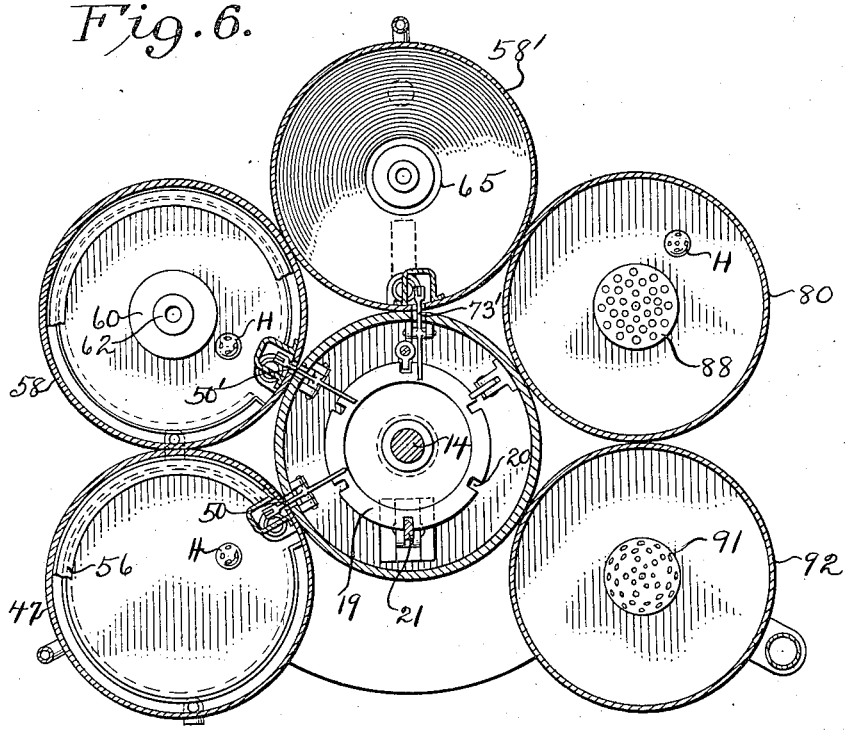
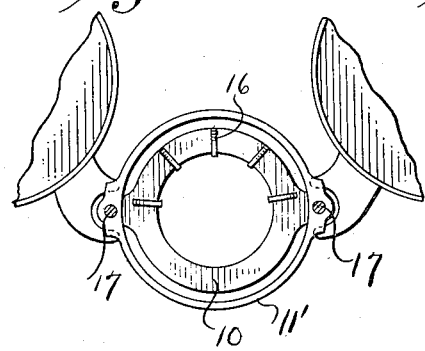
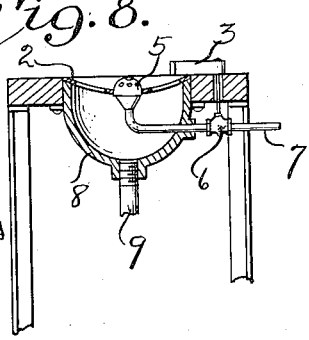

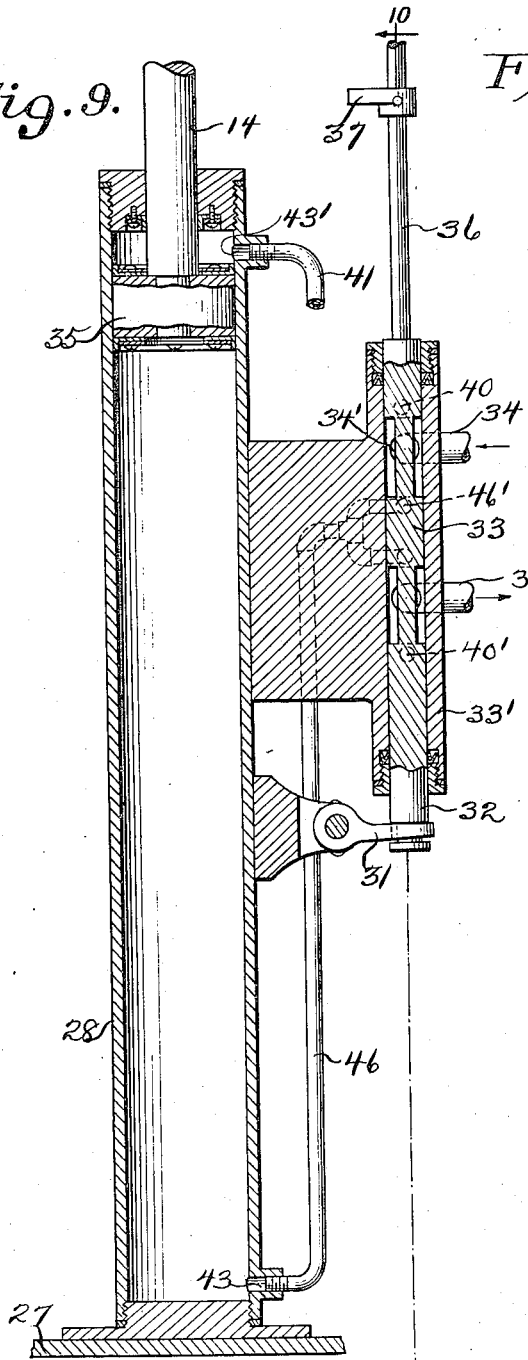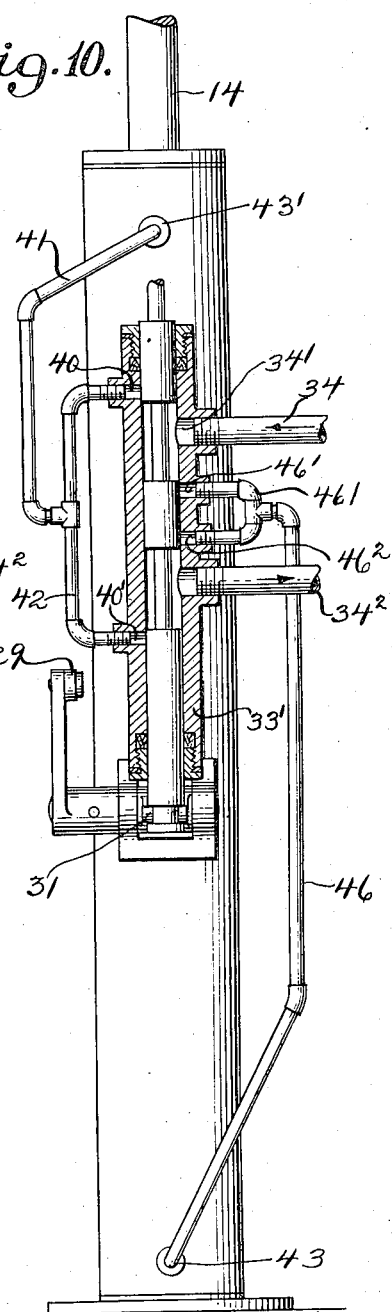

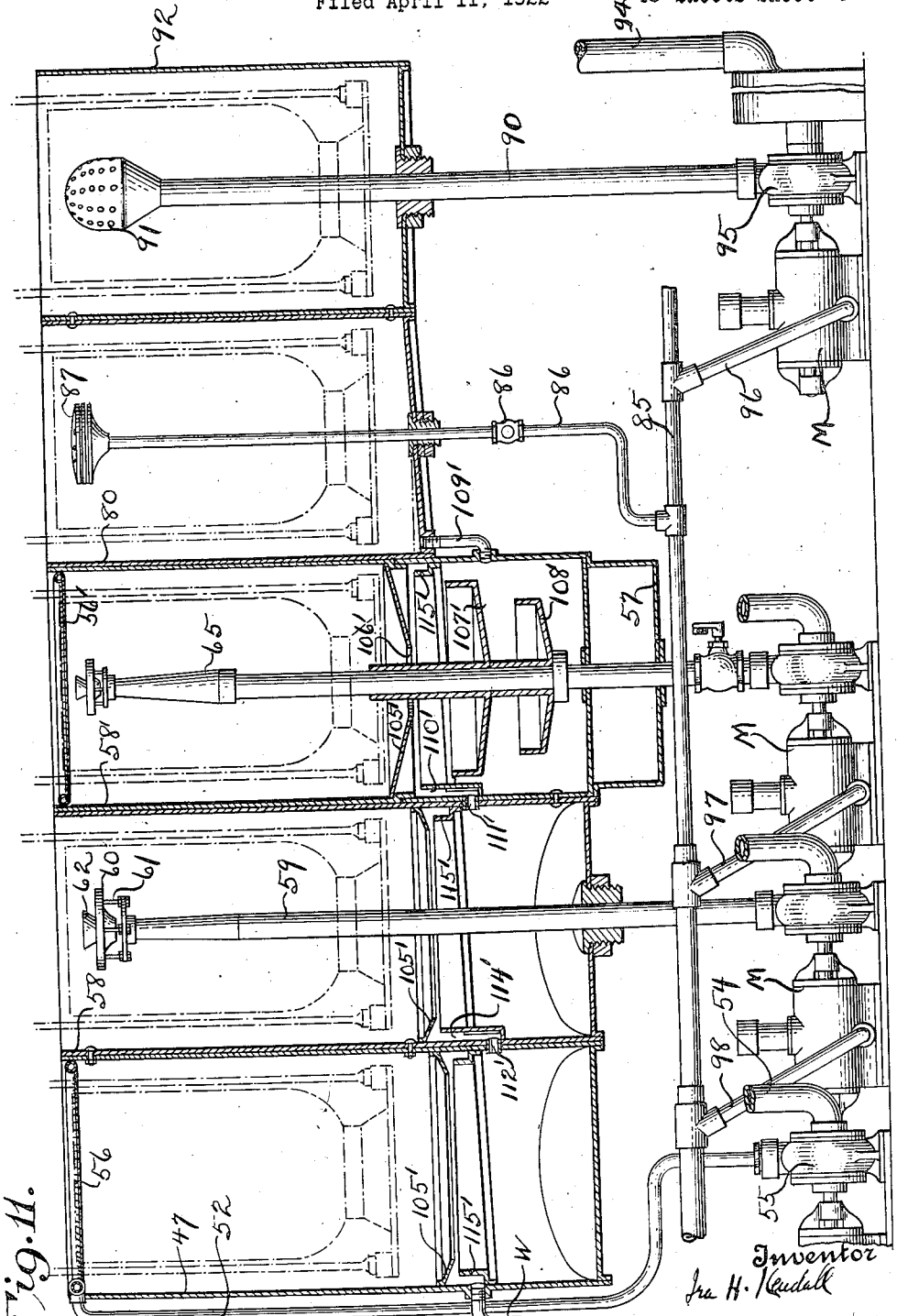

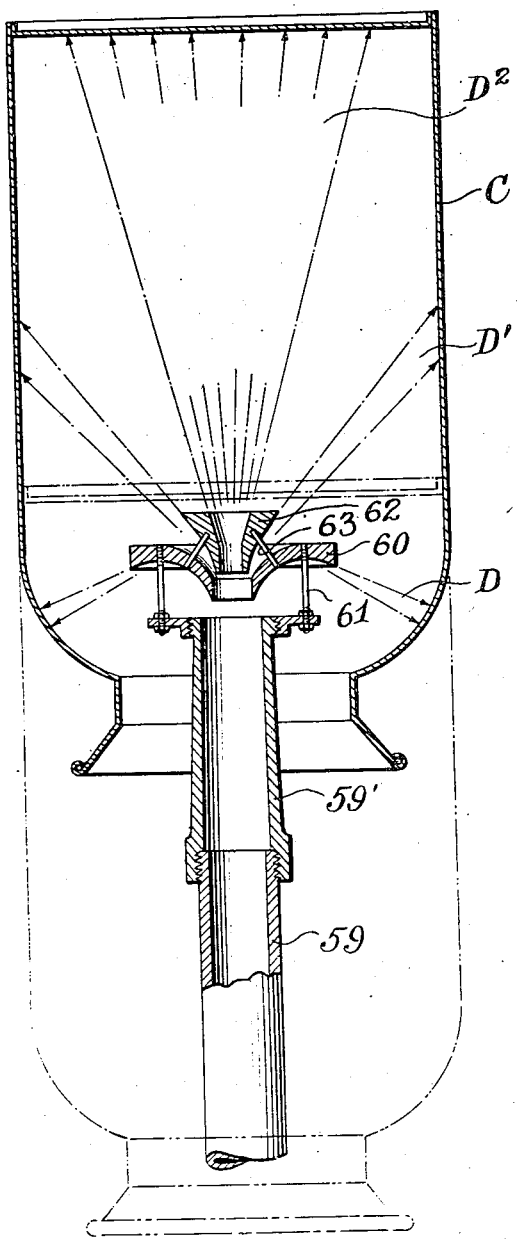
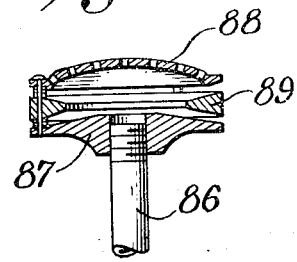
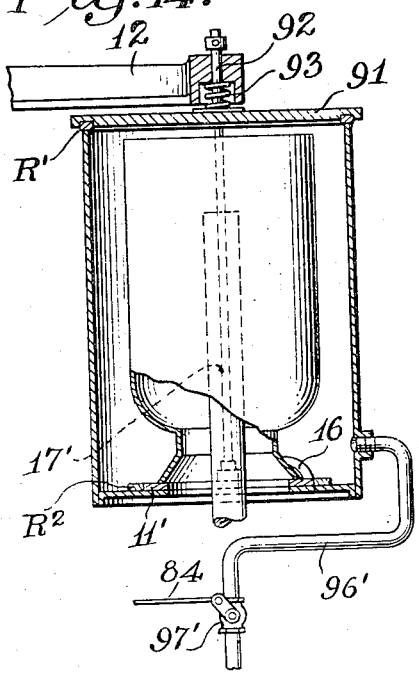

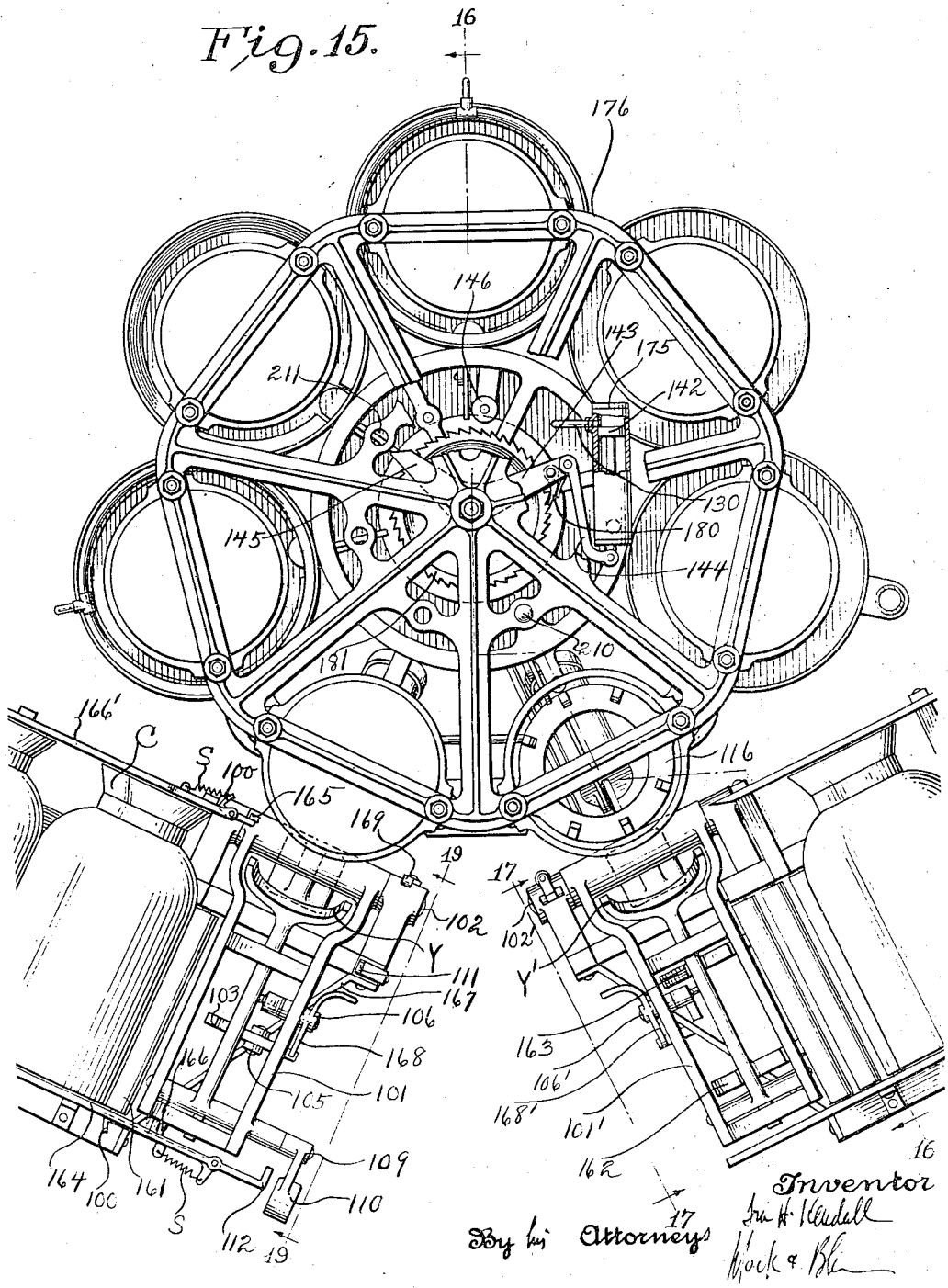

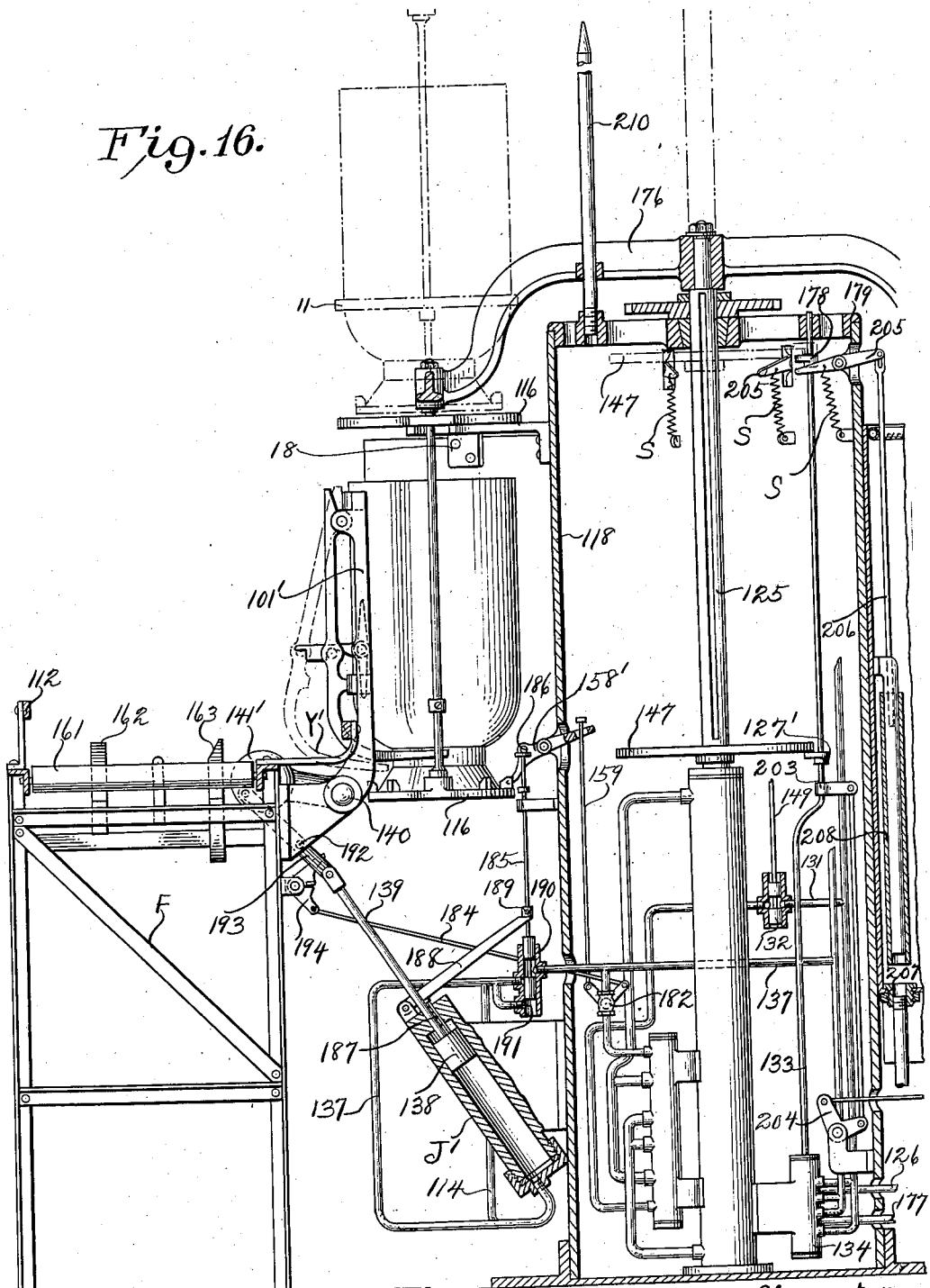

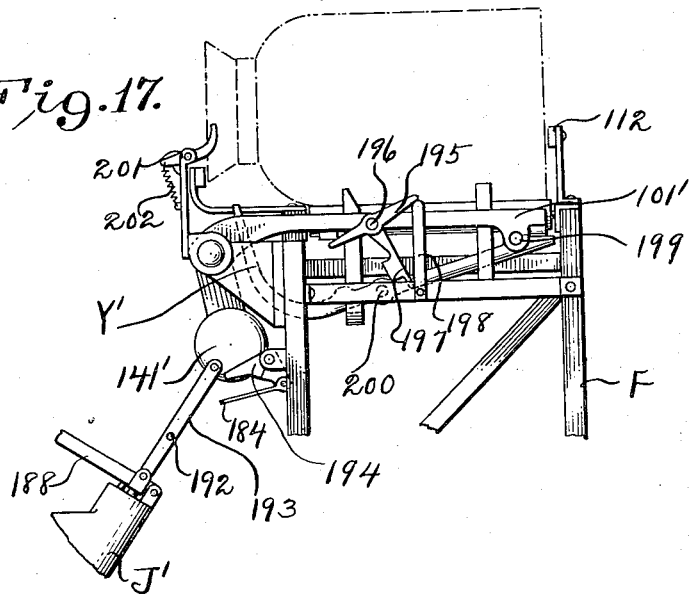
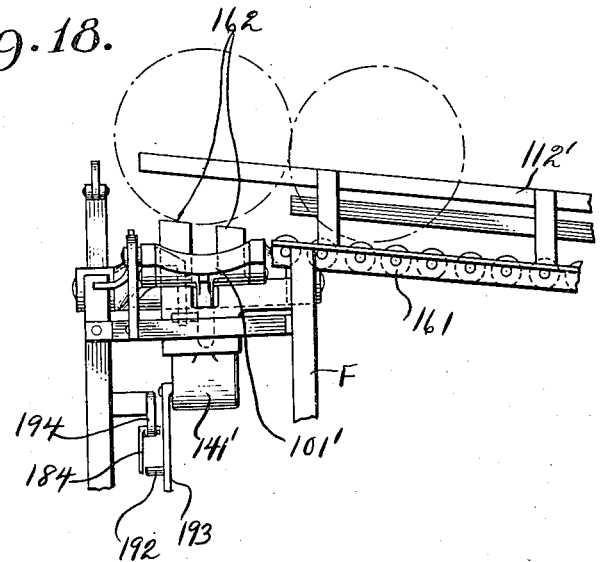

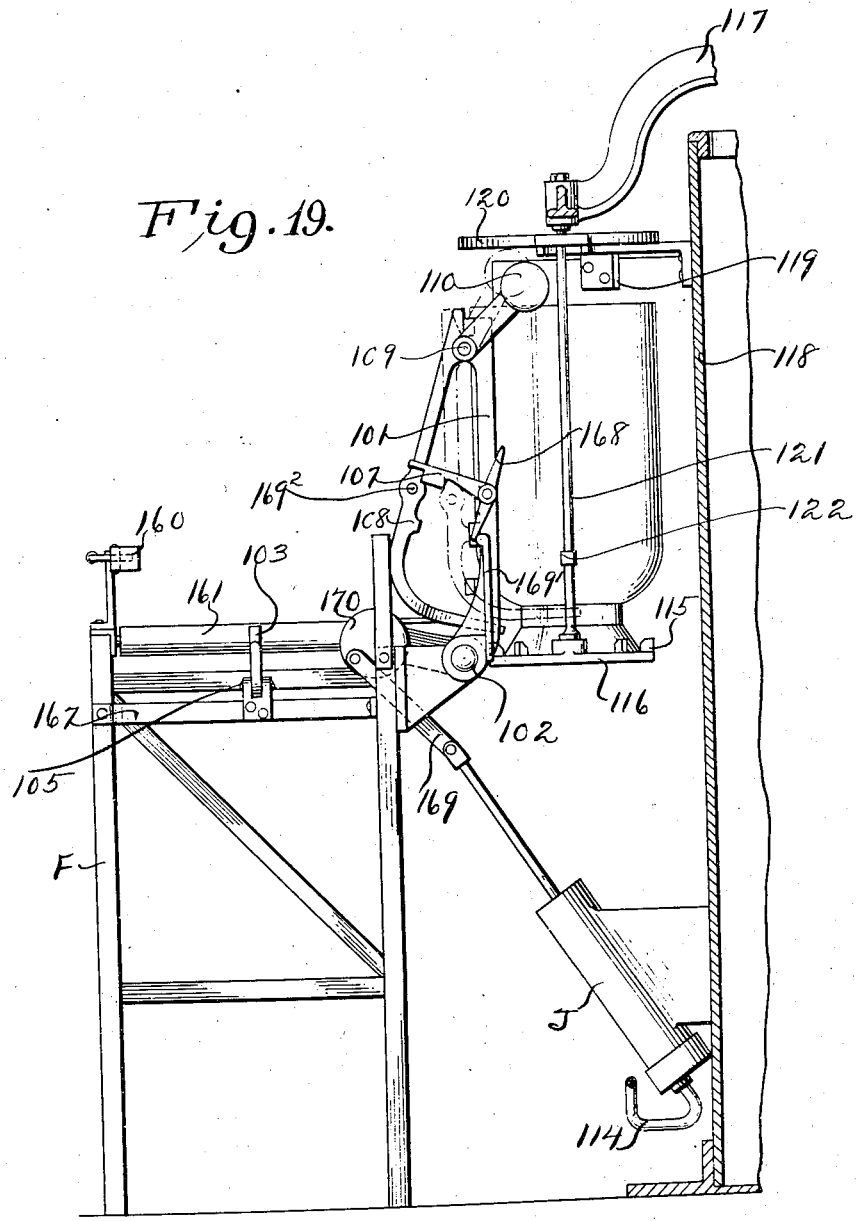

Oct. 4, 1927. 1,644,384
I. H. KENDALL
APPARATUS FOR CLEANSING MILK CANS AND OTHER RECEPTACLES
Filed April 11, 1922   18 Sheets-Sheet 14

Oct. 4, 1927.

I. H. KENDALL 1,644,384

APPARATUS FOR CLEANSING MILK CANS AND OTHER RECEPTACLES

Filed April 11, 1922 18 Sheets-Sheet 18

INVENTOR
Ira H. Kendall
BY Mock & Blum
ATTORNEYS

Patented Oct. 4, 1927.

1,644,384

UNITED STATES PATENT OFFICE.

IRA H. KENDALL, OF POTSDAM, NEW YORK.

APPARATUS FOR CLEANSING MILK CANS AND OTHER RECEPTACLES.

Application filed April 11, 1922. Serial No. 551,570.

My invention relates to a new and improved machine for washing milk cans, ice cream cans, etc.

The thorough cleansing of milk cans which is necessary for the sanitary use thereof is a constant source of considerable expense to dairies. The work must be done largely by hand and a large amount of water is wasted. As many dairies are located in places where a sufficient supply of water is difficult to secure, this presents a serious problem.

One of the objects of my invention is to provide a washing machine for milk cans which will operate in an automatic or in a semi-automatic manner.

Another object of my invention is to provide a device for washing the inside of a can by means of a series of separated jets of water which will thoroughly cleanse every part thereof.

Another object of my invention is to provide a device in which clean water is provided for the final rinsing of a can, and this water is then utilized for the preliminary operation or operations.

Another object of my invention is to provide a device which shall be operated by a series of hydraulic rams or jacks so that the waste or outlet water from these jacks can be utilized in washing the cans.

Other objects of my invention will be set forth in the following description and drawings which illustrate several embodiments thereof.

Fig. 5 is a section on the line 5—5 of Fig. 2.

Fig. 6 is a section on the line 6—6 of Fig. 1.

Fig. 7 is a detail view illustrating one of the can holders.

Fig. 8 is a section on the line 8—8 of Fig. 2.

Fig. 9 is a sectional view through the main jack.

Fig. 10 is a section on the line 10—10 of Fig. 9.

Fig. 11 is a diagrammatic view of the parts illustrated in the previously mentioned figures, arranged in a straight line, showing the cans in dot and dash lines and in lowered position.

Fig. 12 is a sectional view illustrating my improved water sprayer.

Fig. 13 is a sectional view showing my improved steam nozzle.

Fig. 14 is a sectional view illustrating an alternative form of drying chamber or heater which is adapted to be substituted for that shown in Fig. 4.

Fig. 15 is a top plan view of an automatic machine.

Fig. 16 is a section on the line 16—16 of Fig. 15.

Fig. 17 is a view on the line 17—17 of Fig. 15 and shows the apparatus for removing a can from the turntable.

Fig. 18 is a side elevation of the right hand side of Fig. 17.

Fig. 19 is a view on the line 19—19 of Fig. 15 and shows the apparatus for placing a can on the turntable.

Figure 1:
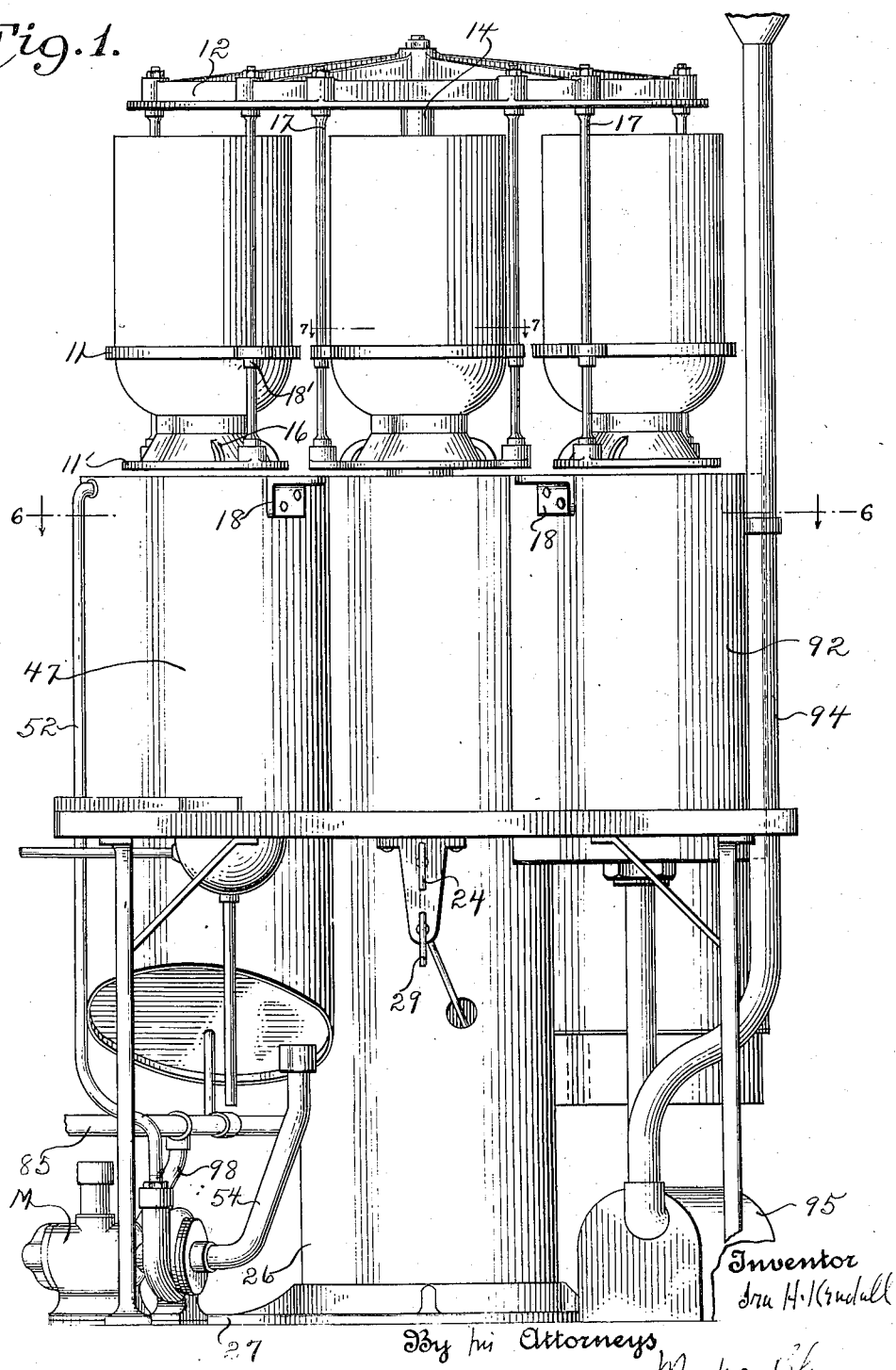
Fig. 1 is a front elevation of a semi-automatic machine showing cans in raised position.
Figure 2:
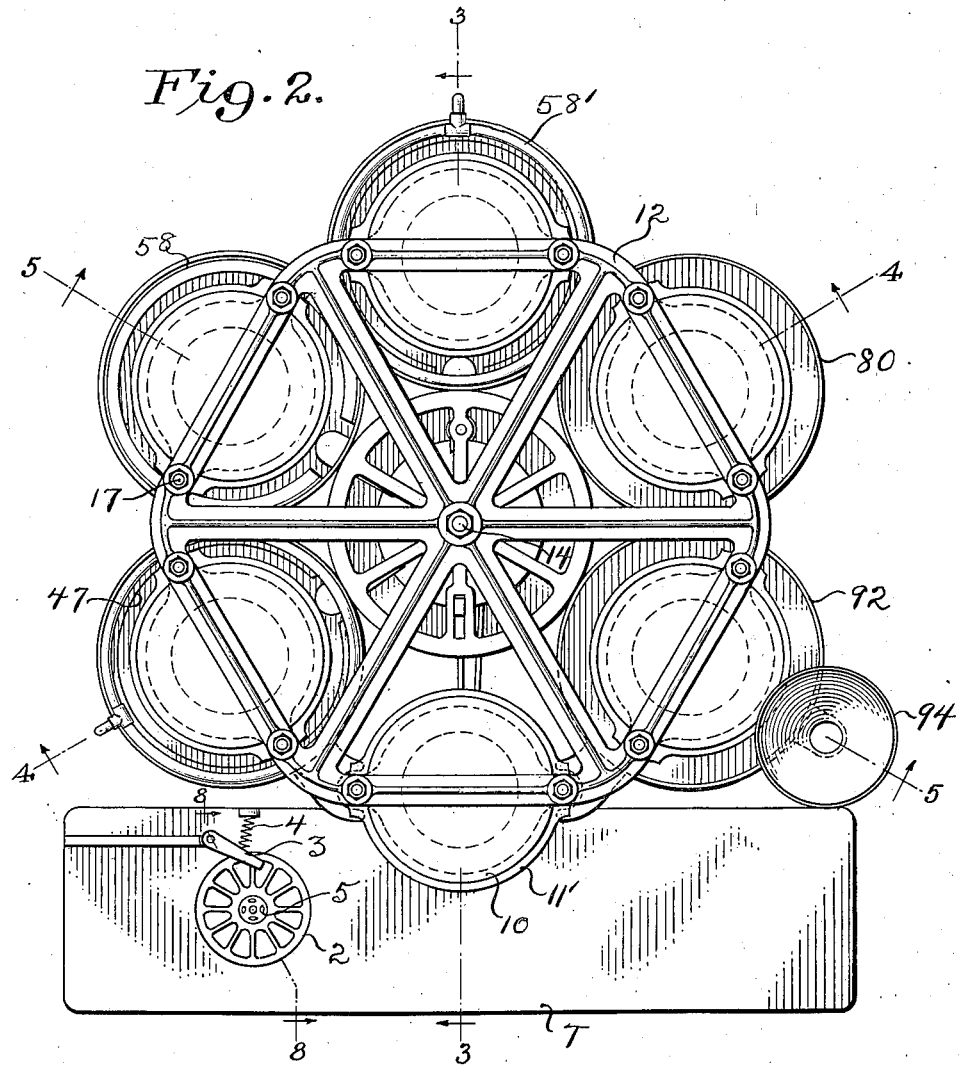
Fig. 2 is a top plan view.

As clearly shown in Figs. 1 and 2 a turntable 12 is mounted on a shaft 14. The turntable 12 has a series of depending rods 17 secured thereto and carriers 10 are secured thereto, one carrier 10 being secured to two rods 17. As clearly shown in Fig. 7, the carriers 10 are surrounded by rims 11' and they each have a series of curved retaining fingers 16 along a portion of their periphery.

As shown in Fig. 1, rods 17 secured to each carrier 10 have a ring 11 slidably secured thereon and resting on collars 18'. The central tubular frame 26 has tanks or chambers secured thereto provided with holding projections 18 which are adapted to support the rings 11 when the central shaft 14 is depressed in the jack 28 which is shown in detail in Fig. 9 until the can C, instead of occupying the uppermost position, shown in full lines in Fig. 3, occupies its lowermost position, shown in dotted lines in Fig. 3. That is, when the turntable 12 is lowered from the position shown in Fig. 1, the projections 18, which are provided on all the tanks or chambers 26, contact with the undersides of slidable rings 11, so that said rings remain resting upon projections 18 while the turntable 12 continues its descending movement.

Hence when the turntable is depressed into its lower position, the can C can be put in position on the carrier 10 and when the turntable is raised, the can passes through a ring 11, which cooperates with the fingers 16 to hold it in position when the turntable 12 revolves. The can is first pushed on the grid 2 on table T. This revolves the lever 3 against the force of the compression spring 4. As shown in Fig. 8, the revolution of the lever 3 opens the valve 6 so that water can pass through the pipe 7 from any suitable source of supply and spray into the can through the nozzle 5. The waste water falls into basin 8, and passes away through drain pipe 9. This gives the can a preliminary washing.

The operator now causes the jack 28 to depress the shaft 14 and the turntable 12 until the carriers 10 are at the level of table T. As shown in Fig. 9 the shaft 14 is secured to piston 35 which slides in a fluid tight manner within jack 28.

As shown in Fig. 9, a pipe 41 communicates with the upper end of jack 28 by means of port 43' and pipe 46 communicates with the lower end thereof by means of port 43. As shown in Fig. 10, pipe 46 communicates with the extension 461 which is connected to ports 46' and 46² of valve casing 33'. The pipe 41 is connected to extension 42 which is connected to ports 40 and 40'. The valve 33 has three piston-like portions which fit tightly in the casing 33' and are separated by intermediate portions of smaller diameter.

Figure 3:
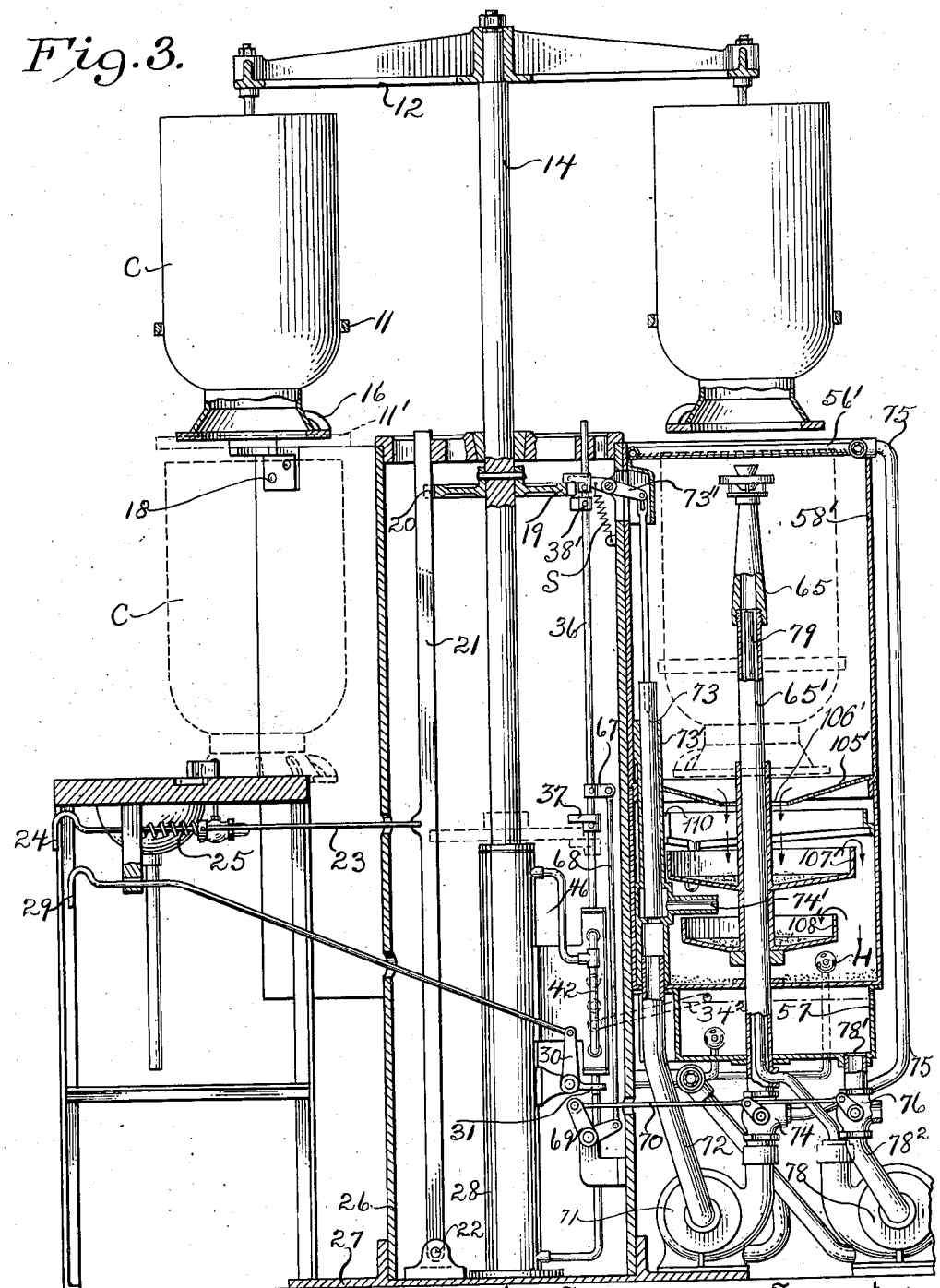
Fig. 3 is a section on the line 3—3 of Fig. 2.

In the position shown in Figs. 9 and 10, the valve 33 is in the position it occupies when the turntable 12 is in the position shown in full lines in the upper part of Fig. 3.

To start the operation of the machine, the operator pulls handle 29 shown in Fig. 3. This causes the lever 30 to revolve counter-clockwise and lifts the yoke 31, shown in Figs. 9 and 10 and which is secured to the bottom extension 32 of the valve 33.

The inlet water enters the port 34' of valve casing 33' through the pipe 34 under pressure from any suitable source and leaves it by means of pipe 34², as shown in Fig. 3 to enter tank 57 for a purpose to be later described.

When the valve 33 is thus lifted the top piston thereof clears port 40, the intermediate piston clears port 46² and the bottom piston leaves pipe 34² open. The water thus enters above the ram piston 35 through port 43' and depresses the revoluble shaft 14. As can be seen in Fig. 3, the shaft 14 has secured thereto a disc 19 having recesses 20. A locking bar 21 is pivoted at 22 to the base 27 of the tubular standard 26, as shown in Fig. 3, and this can be revolved counter-clockwise by pulling upon rod 24 against the force of compression spring 25, which spring urges the bar 21 into the position shown in Fig. 3. The bar 21 may be unlocked before the jack is actuated to bring the turntable 12 into the lower position shown in Fig. 3. When the shaft 14 has been sufficiently depressed, the disc 19 strikes collar 37 mounted upon the rod 36 of valve 33 and forces the valve 33 from what may be called the upper position to its neutral position shown in Figs. 9 and 10. The operator can then push the can into the position shown in dotted lines in Fig. 3, under the fingers 16 of the carrier 10. When the turntable descends, the rings 11 are intercepted by and rest upon the members 18 because they are free to slide above the collars 18' of the rods 17.

The operator then pushes upon the rod 29 so as to revolve lever 30 clockwise and depress the yoke 31 to move the valve 33 to its lower position. In this position the top piston of the valve 33 closes port 40, the intermediate valve piston opens port 46' and closes port 46² and the bottom piston leaves the port 40' open. The water under pressure now passes through port 46' to extension 461, into pipe 46, through port 43 below the piston 35 of the jack to raise the shaft 14 while the water in the jack above the piston 35 passes out through pipe 42 and port 40' to outlet pipe 34².

When the shaft 14 has ascended sufficiently the disc 19 strikes a suitable upper projection on valve rod 36 and restores the valve 33 to its neutral position.

The position of the can is now directly to the right of and above the pipe 5 in Fig. 2, and this may be called its initial position and is indicated by line 3—3. In the next position the outside of the can is to be washed by the apparatus shown more particularly at the left of Fig. 4. When the turntable is again revolved, which is done by hand while the locking bar 21 is in unlocking position, the can will be in the third position on the line indicated by the section line 5—5 in Fig. 2, in which its inside will be thoroughly washed by the apparatus shown at the left of Fig. 5, by means of jets of water containing alkali or other detergent in solution and mixed with sand or any other suitable abrasive.

In the fourth position, again indicated by section line 3—3 in Fig. 2, the inside of the can will be washed by water free of soluble or intermixed substances so as to remove the sand, etc. and the can will be given a final rinsing with pure clean water which has passed directly from tank 57 connected to the jack 28.

Figure 4:
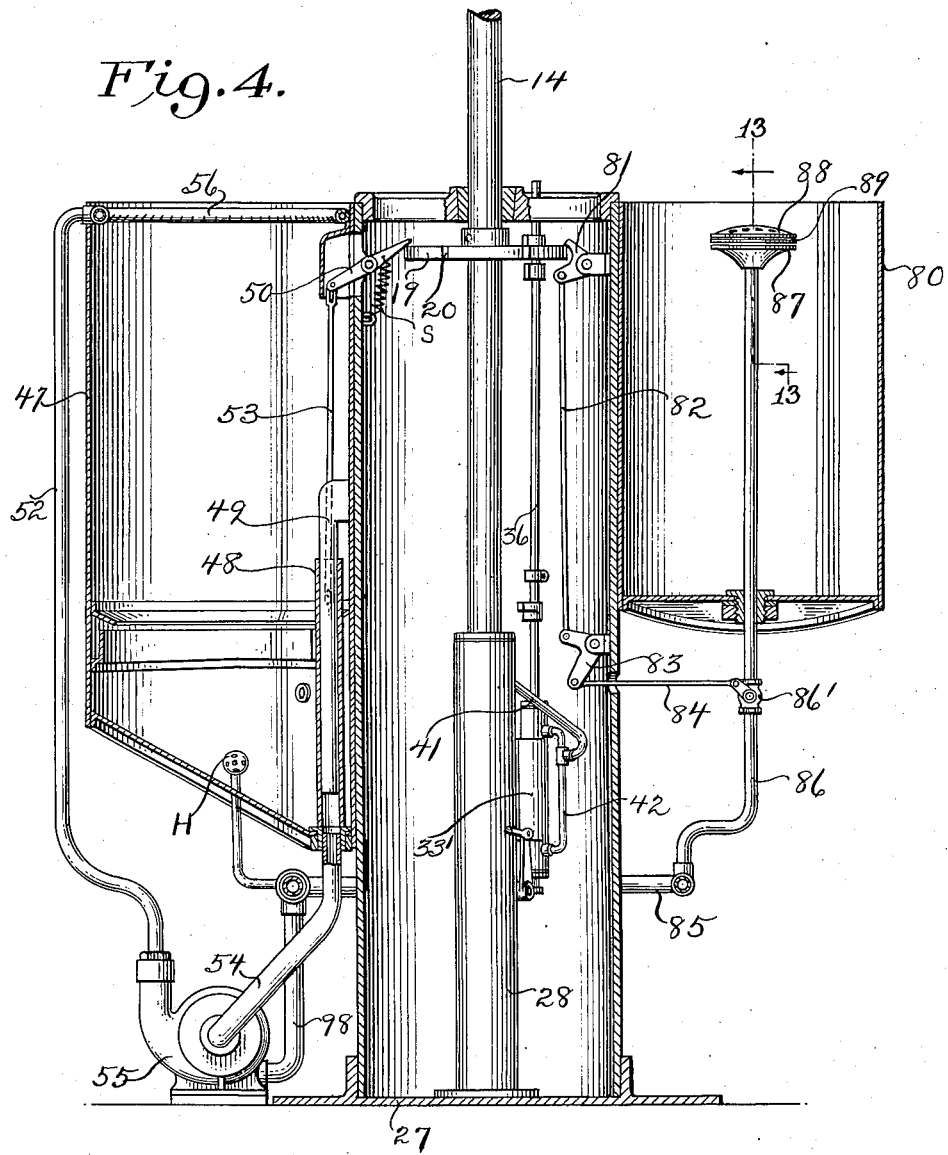
Fig. 4 is a section on the line 4—4 of Fig. 2.

In the fifth position, again indicated by the section line 4—4 of Fig. 2, the can is sterilized and heated by means of wet steam supplied by the apparatus shown at the right hand side of Fig. 4.

In the sixth position, again indicated by the line 5—5 the can can be treated with a blast of clean hot air by the apparatus shown at the right of Fig. 5.

When the operator again revolves the turntable, the can has now been brought to its initial position, when it can be removed, to be replaced by a dirty can.

The disc 19 is supplied with six recesses 20 suitably spaced so that when the locking bar 21 is in position, the shaft 14 can be moved up and down but cannot revolve, and the cans are superposed in proper location above the respective devices for acting upon them.

To economize water, the fresh clean water from the jack performs the final rinsing of the can and is then passed through a series of tanks later to be described to perform the other operations described.

When the can which has been placed upon the bottom carrier 10 shown in Fig. 2 is moved to the second position, the operator again pulls the rod 29.

The can C is now above the tank 47 shown at the left side of Fig. 4. As can be clearly seen in Fig. 4, this tank 47 has a perforated circular pipe 56 connected to pump 55 by means of pipe 52. This pipe 56 thus acts as a rose to enable the thorough washing of the outside of the can. The pump 55 is connected to the bottom of the sloping bottom of tank 47 by means of an intake pipe 54. This intake pipe 54 is provided with a valve pipe 48 adapted to close the upper end of pipe 54 and sliding on rod 49. Pipe 48 is connected to valve rod 53. The lever 50 connected to valve rod 53 is connected to a tension spring such as S which is adapted to revolve it clockwise so as to admit water from the tank 47 to pump 55 which is of any suitable type and is continuously operated by any suitable means such as a steam turbine M shown in Fig. 11 which is mounted on the same shaft and operated by steam entering by means of pipe 98 from steam pipe 85, to which water heater H is also connected to heat the water in tank 47. Steam under pressure is supplied to steam pipe 85 from any suitable source. When the inlet pipe 54 is connected operatively to tank 47, the water therein is circulated through rose 56, and when the valve pipe 48 is in the closed position, the pump 55 operates idly. The overflow water in tank 47 passes out through waste pipe W illustrated in Fig. 11.

When the turntable is in its upper position its disc 19 revolves the lever 50 to the position shown in Fig. 4 in which the pump operates idly, and it is not until the bottom of the can has descended a desired amount preferably below rose 56 that the valve is opened to permit the circulation of the water through rose 56. The water heaters H conventionally illustrated in the drawings may be of any ordinary type.

When the outside of the can has been sufficiently washed, the turntable is again raised and revolved until the can is above tank 58 shown in Fig. 5. This tank 58 has a central water pipe 59 having a tapered nozzle extension 59' provided with a head shown more in detail in Fig. 12. The mouth of nozzle 59' has a spaced annular shield 60 which is open only in the centre thereof, secured thereto by pins 61. A second and smaller annular shield or cap 62 which is open only in the centre thereof, is also centrally secured in a spaced position by pins 63. These parts are shown on a larger scale in Fig. 12.

The water enters through the pipe 59 and then passes through the nozzle 59'. The nozzle 59' has the two annular deflecting shields 60 and 62 secured thereto in spaced relation at the upper end thereof. These annular deflecting shields are preferably perforated only at their central portions. The deflecting shield 60 is centrally located with respect to the nozzle 59' and the cross section of the central opening thereof is smaller than the cross section of the tip of nozzle 59', which is preferably tapered towards the end thereof.

The second deflecting shield 62 is also preferably provided with a somewhat arcuate under surface adjacent the lower end thereof and this as also located centrally with respect to the axis of the pipe 59 and the nozzle 59' by means of the pins or bolts 63. As can be clearly seen in Fig. 12, the cross section of the central opening of the top deflecting shield 62 is smaller at the bottom thereof than the adjacent portion of the opening of the lower deflecting shield 60.

Hence when a stream of water is shot upwardly from the pipe 59 at a pressure of about 50 pounds per square inch, although my invention is not limited to any particular pressure, the said solid stream of water enters the nozzle 59' and emerges from the mouth thereof. The outer or annular portion of the said solid stream of water impinges upon the bottom of the first annular shield 60 with considerable velocity due to the action of the pump 55' operated by a turbine M. The pipe 59 is made of sufficient height so as to allow the energy communicated by the pump 55' to the water to be substantially taken up by the kinetic energy of the moving stream of water. Hence the said annular portion of the solid stream of water issuing from the nozzle 59' is gradually and uniformly deflected without any substantial loss of its velocity until it is downwardly deflected in the form of a solid annular sheet whose path is defined by the diverging rays D shown adjacent the breast of the can shown in full lines in Fig. 12. The rest of the solid stream of water passes through the bore of the first deflecting shield 60 and between 60 and 62. The direction of this second annular portion is gradually deflected without any substantial loss of velocity by the curved upper surface of the shield 60 and the adjacent lower surface of the shield 62 so as to produce a second solid sheet or annulus of water which impinges with considerable velocity on the zone shown by intermediate rays D' of Fig. 12. The remainder of the solid stream of water passes through the bore of the shield 62 and diverges without losing any of its velocity until it strikes the top of the can as indicated by the top rays $D^2$ in Fig. 12.

In the device shown in Fig. 12 the cross sections of the openings through which the three solid sheets of water pass gradually increase so that if any lump or particle is of sufficient size to enter between the annular tip of the nozzle 59' and the first deflecting shield 60, it can easily pass on further because it is continually passing through an opening of increasing size. The same is true of any particle of dirt which finds its way between the shield 60 and the shield 62 or any particle which passes through the bore of the shield 62.

In the nozzles heretofore used, a jet of water of a limited area was allowed to break into drops and to impinge upon the bottom of the can and the water was thus broken up into fine drops which washed the dirt removed from the bottom of the can on to the other parts thereof and especially upon the concave upper part of the body of the can without really removing it. According to my invention such a volume of water is supplied through a nozzle 59' with sufficient cross section with respect to the dimensions of the can that when the water strikes the can in three places, it strikes it in the form of solid sheets which have not yet substantially broken up into fine drops. Hence the can is subjected to a positive scrubbing and percussion action at the top of the can, at the side of the can and also at the concave upper part of the body of the can. As the can is gradually lowered, the top column of water strikes the entire top thereof with sufficient force to thoroughly remove all dirt and it can be noted that when the can is in its bottom position as indicated in dotted lines in Fig. 12 that the two upper sheets of water are concentrated upon the bottom thereof. It will be noted that when the stream of water emerges from the nozzle 59' that a portion thereof is diverted by an upper deflecting surface. When a stream of water flowing in a pipe is compelled to suddenly change its direction or to flow through an aperture or apertures having a cross-section which is smaller than the cross-section of the moving stream of water, there is a considerable loss of head.

According to my invention, however, the stream of water strikes the shield or vane 60 so that a portion thereof has its direction changed so as to separate the stream into a plurality of streams without any substantial loss of head. Similarly, the upper surface of the shield 60 plays little or no part in the formation of the body or stream of water defined by the rays D'.

The under and outer surface of the shield 62 acts as a vane to deflect a portion of the stream of water.

Hence the stream of water which emerges from the nozzle 59' is divided into a plurality of streams by having portions thereof suitably deflected by vanes in contradistinction to being forced through a series of nozzles or through a series of relatively small openings.

In addition it will be noted that when a solid stream of water strikes a rigid surface such as the wall of this receptacle, that the stream tends to spread outwardly with respect to the central axis of the stream. This is very important because the bottom of the can is cleansed by the laterally spreading intermediate sheet, when said sheet impinges thereon.

It will be noted that the cleansing bodies of water, when they impinge upon the lateral wall of the receptacle, have an arcuate lateral contour which approximates or corresponds to the contour of said wall. These arcuate sheets, in the preferred embodiment herein illustrated, cleanse the entire lateral wall of the receptacle. This is accomplished by spreading out each sheet of water by reducing its thickness. This is accomplished by causing the lines of flow to diverge by suitable baffles or vanes, but without breaking it up into the form of a fine spray. The method herein illustrated is the first to utilize a body of water which is spread out circumferentially or laterally, so as to form a sheet having a contour similar to that of a cone, or similar to part of a cone.

As clearly shown in connection with Figs. 3 and 5 the water is pumped through the pipe 59 and the nozzle 59' before the bottom of the can has descended sufficiently to be at the level of the top of the shield 62, that is, the position of the can indicated in full lines in Fig. 12 is the position which the can occupies after the water has been exerting its cleansing action for some time. At the instant that the water is first forced through the nozzle 59 and for some time thereafter, the sheets of water defined by rays D and D' exert their positive scrubbing action upon the neck and breast of the can so that each and every part of the interior of the can is subjected to a direct and powerful scrubbing action while the can is lowered to its bottom position and while it is raised to its upper position.

In the embodiment shown in Fig. 13, a nozzle is shown in which the openings through which the water emerges to scrub the can are made gradually more narrow instead of more wide as in the embodiment shown in Fig. 12. The fluid which may be steam, water or the like passing through the pipe 86 must pass through the annular openings between the shield 87 and the shield 89 only having an opening preferably at the center thereof and between the shield 89 and the top shield 88 which is provided with a series of holes.

The cross section of the pipe 86 is such that its area is greater than the area of the openings and passages between the shield 87 and the shield 89, and that of the annular passage between the shield 89 and the shield 88 and of the perforations in the shield 88.

Hence the fluid emerging from the pipe 86 is forced out between the shield 87 and the shield 89, also between the shield 89 and the shield 88 and through the series of holes in the shield 88. The annular passages between the shield 89 and shield 88 above it and the shield 87 below it preferably become more narrow and the series of holes at the top of the shield 88 may be of the same cross section throughout or they may also taper so as to become more narrow. A positive pressure is thus exerted upon each and every part of the passages through which the fluid emerges so that if any particles of dirt or the like are swept in they tend to be forced out and in any event if a slight clog does take place, at any point between the shield 89 and the shields 88 and 87, this is simply a clog in a wide annular passage and does not prevent a solid sheet of fluid from passing out. The solid sheet of fluid which thus passes out tends to wear away and weaken the grip of any such particle of dirt so that it is finally swept away.

The water in tank 58 is heated and circulated and the circulation thereof controlled in the manner heretofore described with reference to tank 47, the parts 55', 54' H, 48', 49', 53', 50', and S, corresponding respectively to the parts 55, 54, H, 48, 53 and 50 before described both in construction and operation.

The turntable is now again lifted and revolved until the can is above the tank 58' shown at the right hand side of Fig. 3. The tank 57, which receives the fresh pure water from the jack, is below said tank 58'.

The tank 58' is provided with an outlet pipe 74' communicating with pipe 73' and having a valve seat controlled by slidable valve 73 having a rod pivoted to lever 73" which is controlled by a spring S and the disc 19 in the manner before described. The intake pipe 72 connected to pipe 73' is connected with pump 71 mounted on base 27 and having outlet casing 74 connected to pipe 75 which is connected to rose 56', similar in construction to rose 56 shown in Fig. 4. Hence as the shaft 14 descends water is forced through rose 56' to wash the outside of the can again. The pipes 65 and 65' which operate with a rinsing head of the construction shown in Fig. 12, also operate to wash the interior of the can simultaneously, because pipe 65' is connected to casing 74, as shown in Fig. 3.

The tank 57 has an outlet port 78', connected with casing 76, which is connected with pump 78 by pipe 78² as shown in Fig. 3. The pump 78 is connected with pipe 79 which passes through pipe 65', so that it can cooperate with the spraying shields or caps at the top of pipe 65 in the manner before described.

As shown in Fig. 3, the valve rod 36 has a connection 67 whereby it is connected to a link 68 connected to bell-crank lever 69 connected by means of link 70 to valves controlling casings 74 and 76.

Hence, when the can begins to descend into tank 58', the valve 73 is raised and the outside and inside of the can is sprayed.

When the disc 19 depresses the valve rod 36 by forcing down the projection 37, the lever 69 is revolved counter-clockwise and the valve in casing 74 is closed and that in casing 76 is opened. Hence, as the can ascends, its interior is subjected only to a final rinsing action by the pure water pumped out of tank 57 by pump 78 which is not operative while the can is descending. The head on pipe 65 is similar in construction and operation to that shown in Fig. 12.

When the turntable has been raised, it is again turned until it is above the tank 80 shown at the right hand side of Fig. 4. When it descends, it is subjected to the action of dry, hot steam, passing from steam pipe 85 to branch steam pipe 86. Pipe 86 is provided with a lip 87 a spaced shield 89 having only a central opening and a top perforated shield or cap 88 so that the steam is divided into jets and operates to sterilize and heat the can so that it dries without any moisture condensing thereon.

The branch steam pipe 86 has a casing 86' controlled by a valve operated by a link 84 connected to lever 83 operated by link 82 connected to lever 81 controlled by disc 19 so that the valve of casing 86' is opened only when the can has descended so that its neck is below member 87.

The turntable is again raised and revolved and the can is caused to descend into tank 92 shown at the right hand end of Fig. 5. The fan 95 is connected with air pipe 94 communicating with the atmosphere, and it is continuously operated so as to force air which has been heated by a suitable heater in the fan casing, through pipe 91' in said tank 92. The air heater is supplied by branch steam pipe 102.

The turntable is again revolved and turned and the cleansed and sterilized can is now brought back to the starting position. Any desired number of tanks, such as six can be employed in similar manner.

The embodiment shown in Fig. 14 is for the purpose of enabling the can to be thoroughly sterilized by raising it to a relatively very high temperature, by means of steam which may be at very low pressure. The steam chamber is provided with an annular bottom, the open center of which has a gasket $R^2$ secured thereto in any suitable manner. The turntable 12 has a cover 91 provided with another gasket $R'$ tightly secured thereto and this cover 91 is secured to the turntable 12 by means of the pin 92 and the intermediate spring 93 which is relatively short and of considerable strength.

The apparatus is provided with an air pipe 17' which projects through the opening in the center of the bottom of the steam chamber and is connected to any suitable source of heated air or any suitable pump connected with a heater which can force heated air to it. When the can is placed in position the collar fits tightly into the lower gasket $R^2$ and the top of the tank is sealed very tightly by the cover 91, having the gasket $R'$. At the same time the turntable 12 presses the cover 91 down with considerable force, the gasket $R'$ being made somewhat resilient so that the parts do not become broken or worn out. The device shown in Fig. 14 could be used in connection with the parts previously described, to accomplish a final sterilization. Only a single steam chamber having a single cover 91 is necessary in a complete apparatus.

When the link 84 is operated as before described so as to open the steam valve in casing 97', the steam passes through pipe 96' and it cannot escape because of the gaskets $R'$ and $R^2$ and because the turntable 12 keeps the cover firmly in position. At the same time heated air is passed into the interior of the can through the pipe 17' and in a very short time the temperature of the can is sufficient to thoroughly sterilize it in all parts thereof.

After the steam is shut off and the cover 91 is removed, the cooling of the highly heated can might cause some steam to condense thereon so as to make it moist which is undesirable. Hence the powerful stream of heated air is forced into the interior of the can while it is being moved outside of the steam chamber and even after it passes completely out of the steam chamber and this heated air causes the can to be completely dried.

In connection with the use of sand or other fine scrubbing material it is highly important to have the tanks 47 and 58 with inclined bottoms so that any sand or the like which descends to the bottom thereof slides down by its own weight to the pipe leading to the pump. This enables the use of only a small amount of sand which prevents the pump and pipes from clogging up, and causes all the sand to pass continuously through the pump to exert its scrubbing action.

It will be noted that whenever the interior of the can is acted upon by a jet of air or steam or the like, that the can is located within a tank having a closed bottom and walls, during the greater part of the said treatment so that the currents of steam, hot air, or the like which are forced into the interior of the can flow downwardly from the interior of the can and then flow upwardly along the walls of the can and the walls of the tank so that the fluid is doubly utilized for treating both the inside and the outside of the can.

As the machine is operated the water in tank 58' rises to the top of the apron or gutter 105' which extends completely around the inside of the tank so as to have an area which is considerably greater than the area of the pipe through which the water is forced. At each washing operation in the tank 58' only a relatively small amount of water passes into the said tank and this passes slowly through the opening 106'. The slow movement of the water causes the dirt to remain at the top thereof and the dirty top portion of the water carrying with it most of the loose dirt overflows the gutter 105' through the opening 110' and out through the opening 111' to rise to the top of the water in the tank 58. It will be noted that the gutter becomes deeper towards the opening 111' so as to cause a very slow flow of water to the said opening 111'. The overflow movement occurs in other tanks. For example, the dirt in the water in the tank 58 which tends to flow to the surface of the water overflows gutter 115' therein, slowly passes to the deep part of the said gutter to the part 114¹ and out through the opening 112' to the tank 47 and the dirty part of the water similarly overflows the gutter 115' therein and out through the waste pipe W.

As shown diagrammatically the pumps and the air fan or blower are operated by steam motors or turbines M which are not illustrated in detail as in themselves they form no part of my invention. The motor M for the air blower is supplied by branch steam pipe 96 shown in Fig. 11.

All the tanks in which water is circulated have the gutters or aprons 105' with the central perforations shown. The pans 107' and 108' catch all or nearly all of any sand that is removed from the cans by the rinsing water. The rinsing water first flows through opening 106', and the tapering shape of gutter 105' permits the relatively heavy sand to also pass through opening 106', to drop into tank 107'. Some of the sand settles in tank 107' which is below overflow 110'. When water is pumped out of the tank through member 74', it flows over the lower tank 108', which collects sand present in the flowing water. The flow of the water is indicated by arrows in Fig. 3.

As can be seen in Fig. 3, a collar 38' is secured to valve rod 36 and this has an extension so that disc 19 can only pass below said collar 38' without depressing it, only when a recess 20 is in line therewith and this only takes place when the various can carriers are above their respective chambers or tanks in proper position. This is a safety device.

The various pipes shown can each have a hand operated valve connected therewith. The various steam and water pipes in the tanks can also have valves which are normally shut but which are automatically opened to cause the before mentioned operations to be performed only when the said pipes have cans above them on the respective superposed carriers.

For example, each said valve could be controlled by a horizontal lever similar to lever 73'' shown in Fig. 3, and adapted to be revolved by the concave upper part of the body of the can when this is lowered so as to open it, while a spring would normally hold it in closed position. The rings 11 could be omitted, as they are not necessary.

Figure 26:
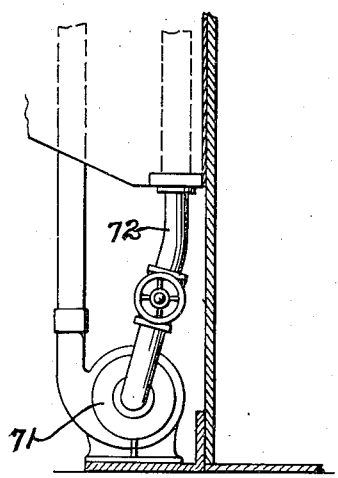
Figs. 26 and 27 illustrate mechanism showing the means for automatically operating the valves of the various steam and water pipes associated with the tanks, so that said valves are normally shut but are automatically opened only when the cans are in proper position.
Figure 27:
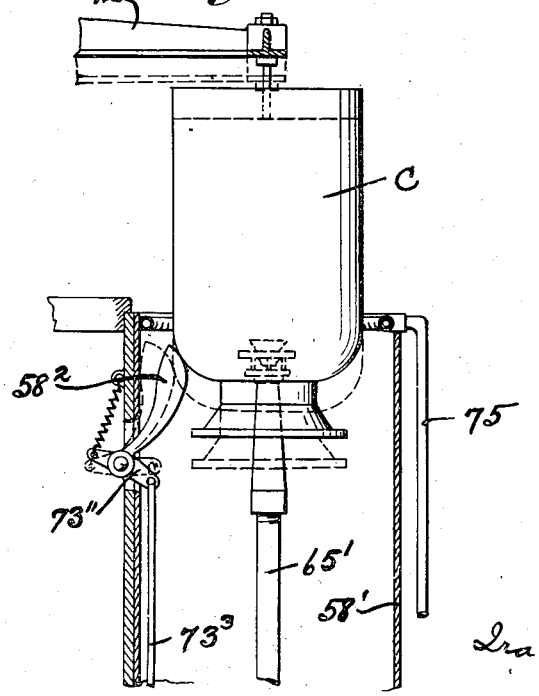

For example, as shown in Figs. 26 and 27, the member 73'' which is connected to the rod 73' connected to the valve 73 shown at the right-hand side of Fig. 3, can have a control member 58² connected thereto. This control member has a tapered end which co-operates with the rounded portion of the body of the can, so that the member 58² is moved from the position shown in full lines in Fig. 27 to the position shown in dotted lines in Fig. 27 when the can C has been lowered a sufficient distance into the tank 58'.

The sloping bottoms of tanks, like tank 58, in which sand is mixed with the water, causes said sand to always slide towards the intake pipe of the connected pump.

Figure 22:
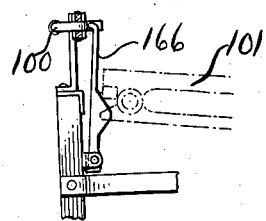
Fig. 22 is a section on the line 22—22 of Fig. 21.

In the modified machine shown in Figs. 15 and thereafter, the cans C are placed upon a chute mounted upon a frame F. This chute is provided with rollers 161 and it also has side guides 166' and 164. The cans are prevented from moving out of the chute by two pawls 100 which are normally caused to project inwardly in the path of the cans by means of springs S. When the cans roll off the chute they roll upon the cradle 101 pivoted upon the shaft 102. When the cradle is in the horizontal position shown in Fig. 15, for example, the projection 165 on the cradle pushes one of the pawls 100 to the inoperative position. At the other end thereof, the cradle contacts with the lever 166 and forces it away from the position shown in Fig. 22 so that it moves the other pawl 100 to the unlocking position. Hence when the cradle is in the horizontal position one of the cans rolls upon the said cradle 101 and is stopped by the projection 111 of the cradle and the hook end 112 of guide 164. When the can rolls upon the cradle 101, it depresses the lever 103 shown in Fig. 15, pivoted at 105 below the body of the cradle, the said pivot 105 being however, connected to the frame member 167 which remains stationary.

As clearly shown in Fig. 15 the revolution of the lever 103 around its pivot 105 causes the revolution of the lever 168 which is pivoted at 106 to the cradle and has the latch 107 rigidly secured thereto. In the view shown in Fig. 20 this revolution of lever 168 causes the latch 107 to revolve clockwise. When the latch 107 thus revolves, the hook 108 which forms part of the yoke Y is released so that the said yoke Y may then freely revolve around the pivot 109 which is secured to the cradle. The yoke Y has the weight 110 secured thereto and this tends to revolve the yoke Y around the pivot 109 in the counter-clockwise direction when the parts are in the position shown in Fig. 20.

Figure 20:
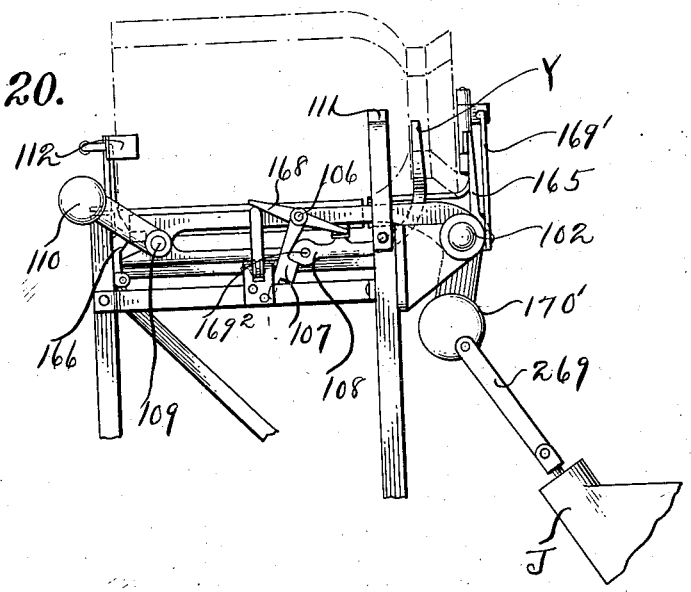
Fig. 20 shows the device of Fig. 19 in its horizontal position.
Figure 21:
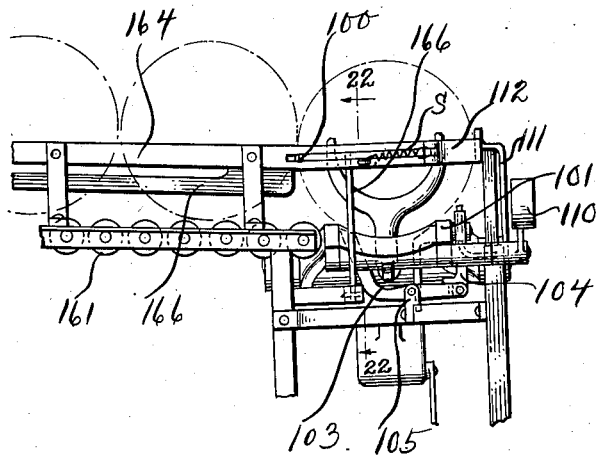
Fig. 21 is a side elevation of the left of Fig. 20.

The next operation is to revolve the cradle around the pivot 102 secured to the frame so as to bring the parts from the position shown in Fig. 20 to the position shown in Fig. 19. This is done by the jack J shown in Fig. 19 having a piston therein of the ordinary type and this piston is pushed upwardly so as to revolve the cradle by means of the link 169 which is pivotally secured to the cradle at the weight 170', as clearly shown in Figs. 19 and 20. This weight 170' tends to revolve the cradle back into its horizontal position when the hydraulic pressure in J has been released. When the cradle has been brought into upright position, the weight 110 revolves the yoke Y around its pivot 109 in the clockwise direction so that the said yoke is released from the can which then rests upon the carrier 116 secured to the rod 121.

When the cradle is rocked into vertical position the lever 168 contacts with the stop 169' secured to the stationary frame of the machine so that the said latch 107 is revolved in the clockwise direction in the view shown in Fig. 19. This releases the hook 108 so that the weight 110 is free to revolve the yoke from the dotted line or holding position shown in Fig. 19, to the full line or release position shown in Fig. 19. This leaves the can to be held between the beveled fingers 115 of the carrier 116 secured to the rods 121 having the collars 122. When the cradle is originally revolved by the jack J the can is firmly placed upon the carrier 116 so that the weight of the can is now no longer borne by the yoke Y which is therefore free to move away from the can.

When the yoke Y moves into the full line position shown in Fig. 19 it tends to remain in this position during the first period of the backward revolution of the cradle so that the latch 107 is free to drop and engage the pin 169² upon the said hook 108. This locks yoke Y in its inoperative position until the can which rolls upon the cradle again revolves the lever 168 when it is moved back to horizontal position when the weight 110 moves the yoke Y back into its operative and holding position.

Figure 23:
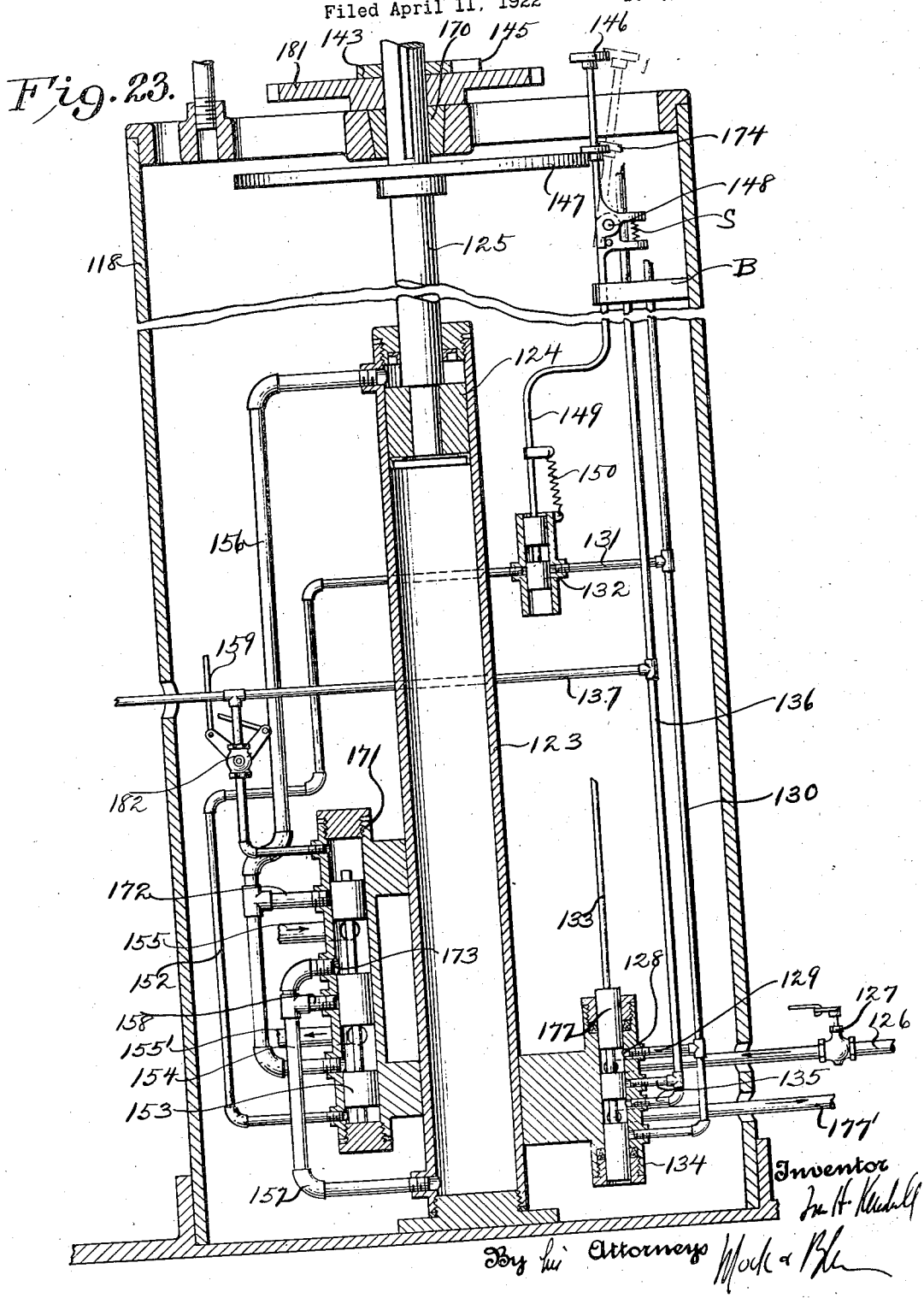
Fig. 23 is a section through the main lifting jack.

The hydraulic control mechanism to automatically raise and lower the cradle is shown in detail in Fig. 23. The jack 123 has a piston 124 upon which the shaft 125 is mounted as before described. The shaft 125 has the control disc 147 secured thereto. The shaft 125 moves up and down through the bearing 170. The cylinder of the jack 123 which is mounted within the tubular frame 118 has a pipe 156 communicating with a suitable port at the upper end thereof. The bottom of the pipe 156 communicates by means of a suitable port with a casing 171 of the control valve 153. This valve 153 is composed of three superposed and spaced piston parts separated by intermediate portions of smaller diameter as before mentioned. The pipe 156 also communicates with the upper end of the valve casing by means of the cross pipe 172. The pipe 155 is connected to any suitable source of water under pressure and this communicates with the valve casing 171 by means of a suitable port as shown. The pipe 155' which is the outlet or drain pipe for the valve casing 171 is connected to any suitable outflow tank or the like, preferably to the fresh water tank of the washing system as heretofore described.

The bottom of the jack 123 communicates by a suitable port with the elbow pipe 157 and the top of this pipe communicates with the valve casing by means of the port 173. Said pipe 157 is also connected with valve casing 171 by cross pipe 158. The bottom of the valve casing also communicates by means of a suitable port with a pipe 152 which is controlled by means of an intermediate piston valve 132 which is acted upon by means of the tension spring 150, connected to the valve rod 149 of the said valve 132.

As clearly shown in Fig. 23, the curved valve rod 149 has an extension 146 pivotally secured thereto at 148 and an intermediate collar 174 can contact with the control disc 147. The extension 146 is normally held in the vertical position so that the collar 174 can engage with disc 147 by means of the compression spring S, and a pin is provided as shown in Fig. 23 so as to prevent the said extension 146 from being revolved from the vertical position in the counterclockwise direction. The casing of the valve 132 is connected by means of a suitable port to the pipe 131 and this is connected to the vertical pipe 130. The pipe 130 is connected at the upper end thereof to the jack 175 shown in Fig. 15 and which has therein the piston 142, the movement of which intermittently revolves the turntable 176 as will be more fully explained hereafter. The bottom of the pipe 130 communicates by means of a suitable port with the bottom of a valve casing 134 which has therein a valve 177 provided with three piston-like parts as before described.

The pipe 126 controlled by an ordinary hand valve 127 is connected to any suitable source of water under pressure and an outlet pipe 177' is provided for the said valve casing 134 and as before mentioned the said outlet pipe 177' is preferably connected to the fresh water tank 57 for the washing system as before mentioned.

A vertical pipe 136 connected to a cross pipe 137 terminates in two branches 135 which are connected to the valve casing 134 by means of suitable ports and the pipe 137 is connected as shown in Fig. 16 directly to the jack J' which serves to remove the washed cans from the turntable and to place them upon the removing chute which will be later more fully described. The pipe 114 branches off from the upper part of the pipe 137 shown in Fig. 16 and this is connected to the jack J clearly shown in Fig. 19, which actuates the cradle for lifting the cans from the entrance chute and placing them upon the carriers of the turntable 176. When the machine is about to be operated the valve 127 is closed and the turntable is in its upper position with the piston 124 as shown in Fig. 23.

When the piston 124 is in its top position the valves 177 and 153 are in the position shown in Fig. 23 which shows what may be called the initial or starting position of the machine.

When the valve 127 is opened and a corresponding valve which is not shown in the drawings is opened in the pipe 155 the water entering through pipe 155 cannot pass into the pipe 172, although it can pass through the pipe 157 below the piston 124. Hence, if for any reason, the piston 124 is not in its uppermost position, it will be rapidly forced to this uppermost position. If for any reason the said piston 124 is not in the position shown in Fig. 23, then by opening the valve of pipe 155 first it can be moved to this top position. The drain water passes out through pipe 156 to the bottom thereof and out through pipe 155'.

The water entering through the pipe 126 enters the valve casing 134. As clearly shown in Fig. 16, the valve rod 133 is provided with an intermediate collar 127' and a top collar 178 and the control disc 147 engages the inside of this collar 178 and moves it to the position shown in Fig. 23. The guide member 179 is provided at the top of the tubular frame 118 and this guides the movement of the curved sliding valve rod 133. The water entering through the pipe 126 then passes out through the pipe 129 into the pipe 130 and upwardly to the jack 175 and pushes the piston 142 outwardly. This piston is connected by means of the link 144 to the lever 143 pivoted at the center of the mechanism and this lever 143 has the ordinary spring pressed pawl 180 which cooperates with the ordinary ratchet disc 181 connected to the turntable shown in Fig. 23, for example, in the ordinary manner.

The lever 143 has an arm 145 clearly shown in Figs. 15 and 23 and the revolution of the lever 143 causes the arm 145 to move the extension 146 of the lever 149 away from the control disc 147 and into the dotted line position shown in Fig. 23, overcoming the force of the compression spring S. The tension spring 150 immediately lowers the valve rod 149 so that the collar 174 cannot re-engage the control disc 147. The valve 132 shown in Fig. 23 is thus depressed and the water can enter the cross pipe 131 and the pipe 152 and can therefore enter the bottom of the valve casing 171 below the bottom piston of the valve 153. The valve 153 is thereupon pushed upwardly until the top of its rod contacts with the top of the casing 171. It is understood that this drawing is largely diagrammatic and that any suitable cushioning means could be used for preventing the said valves or any other valves from being moved too violently. This upward movement of the valve 153 opens the ports of pipes 172 and 158 and closes the bottom port of pipe 156. Hence the water under pressure can now flow into the pipe 156 and upwardly therein above the piston 124 and cause the turntable to be lowered while any water below the said piston 124 can flow out through pipe 157 and into the valve casing through the port of pipe 158 and then through pipe 155'.

When the turntable has descended to the bottom, the control disc 147 strikes the collar 127' as shown in its lower position in Fig. 16 and this causes the valve rod 133 to be depressed until the top piston thereof closes the upper branch of the pipe 130 while the intermediate piston thereof opens the upper cross branch 135 and closes the lower cross branch 135 and at the same time the bottom piston of the said valve opens the port of the lower branch of the pipe 130.

As is clearly shown in Fig. 16, when the turntable is depressed the carrier 116 contacts with and revolves a lever 158' in the counterclockwise direction and this raises the rod 159 of the valve in the casing 182 so as to close the said valve which hitherto has remained open. The water under pressure which has now entered the pipe 136 passes through the pipe 137 and then to the jacks J and J' because the revolution of the lever 158' has depressed the valve rod 185.

When the turntable descends with its carriers 116 one of these carriers 116 revolves the lever 158' in the counterclockwise direction until the said carrier 116 passes beyond the said lever 158' leaving the said lever 158' free to revolve in the reverse or clockwise direction. The lever 158' is so weighted that its left end tends to project within the path of movement of carrier 116.

When the lever 158' has been revolved so that the pin 186 is at the bottom of its movement, then the rod 185 has been depressed so that the piston valve controlled thereby has opened the port of valve casing 190 shown on the lower left side of Fig. 16 so that communication is established between the two branches of the pipe 137 and the two pistons 138 of the jacks J and J' are thereupon moved outwardly so as to upwardly rock the two cradles 101 and 101'. Piston 138 of jack J' comes into contact with supplemental control rod 187 and moves it outwardly so as to upwardly rock lever 188 which raises the valve rod 185 by means of the collar 189 and moves the rod 185' back until communication is cut off between the branches of pipe 137 by means of the valve in the casing 190 and the lever 158' has its end above the carrier 116 and between the beveled fingers on the said carrier. The rod 130

185 acts on pin 186 on lever 158' and jacks J and J' have substantially the same control system. However the yoke Y', pivoted to cradle 101' has no weight secured thereto. When the piston valve in the casing 190 has thus been upwardly moved so as to open the port 191, then the weights 170' and 141' rock the respective cradles back to their horizontal position because the water in jacks J and J' is free to escape by any suitable pipe not shown in the drawings, preferably to the fresh water tank 57 before mentioned. When the cradle 101' revolves back to its horizontal position, the pin 192 upon its link 193 contacts with the lever 194 so as to revolve it clockwise and pull upon the link 184 so as to again open the valve in casing 182. When the carrier 116 is raised it revolves the lever 158' so as to move it away from the stud at the top of rod 159, so that no effect is produced.

As shown in Fig. 23, the water under pressure in pipe 137 is now free to enter the top port in valve casing 171, and move the valve back to the position shown in Fig. 23. The water under pressure in pipe 155 then enters casing 171, and passes out through port 173 and passes through 157 below the piston 124 so that the turntable again moves upwardly to contact with the collar 178 and raises the piston valve 177 to the position shown in Fig. 23.

When the cradle 101' takes off a can, the said can contacts with the projections 162 and 163 so as to free it from the cradle 101' and allow it to roll down the outlet chute having the guards 112'.

As shown in Figs. 16–18, the cradle 101' pivoted at 140 has the lever 195 pivoted thereto at 196 and provided with a latch 197. In the position shown in Fig. 17, the lever 195 has been moved to the position indicated therein by the stationary projection 198. The weight of the yoke Y' which is pivoted to the cradle 101' at 199 causes it to fall into the dotted line position. As the cradle 101' is raised the end of the latch 197 engages the pin 200 because the weight of said latch swings it into position and holds the yoke Y' relatively inclined to the cradle 101'. When, however, the cradle 101' is almost vertical the lever 195 secured to latch 197 and pivoted at 196 contacts with the pivoted lever 201 shown in Fig. 17 and acted upon by the tension spring 202, and this causes the end of the latch 197 to release the pin 200 so that the yoke can rock into the vertical position shown in full lines in Fig. 16 and engage a can. When the cradle 101' drops back to its horizontal position, the lever 201 can rock sufficiently to pass out of the way.

The lever 194 really consists of two separately pivoted parts, the upper part of which shown in Fig. 16 can revolve counterclockwise freely with respect to the lower part, but engages it as soon as it is rocked clockwise. As shown in Fig. 20, the rod 269 connected to piston of jack J is connected to weight 170' of cradle 101.

Figure 24:
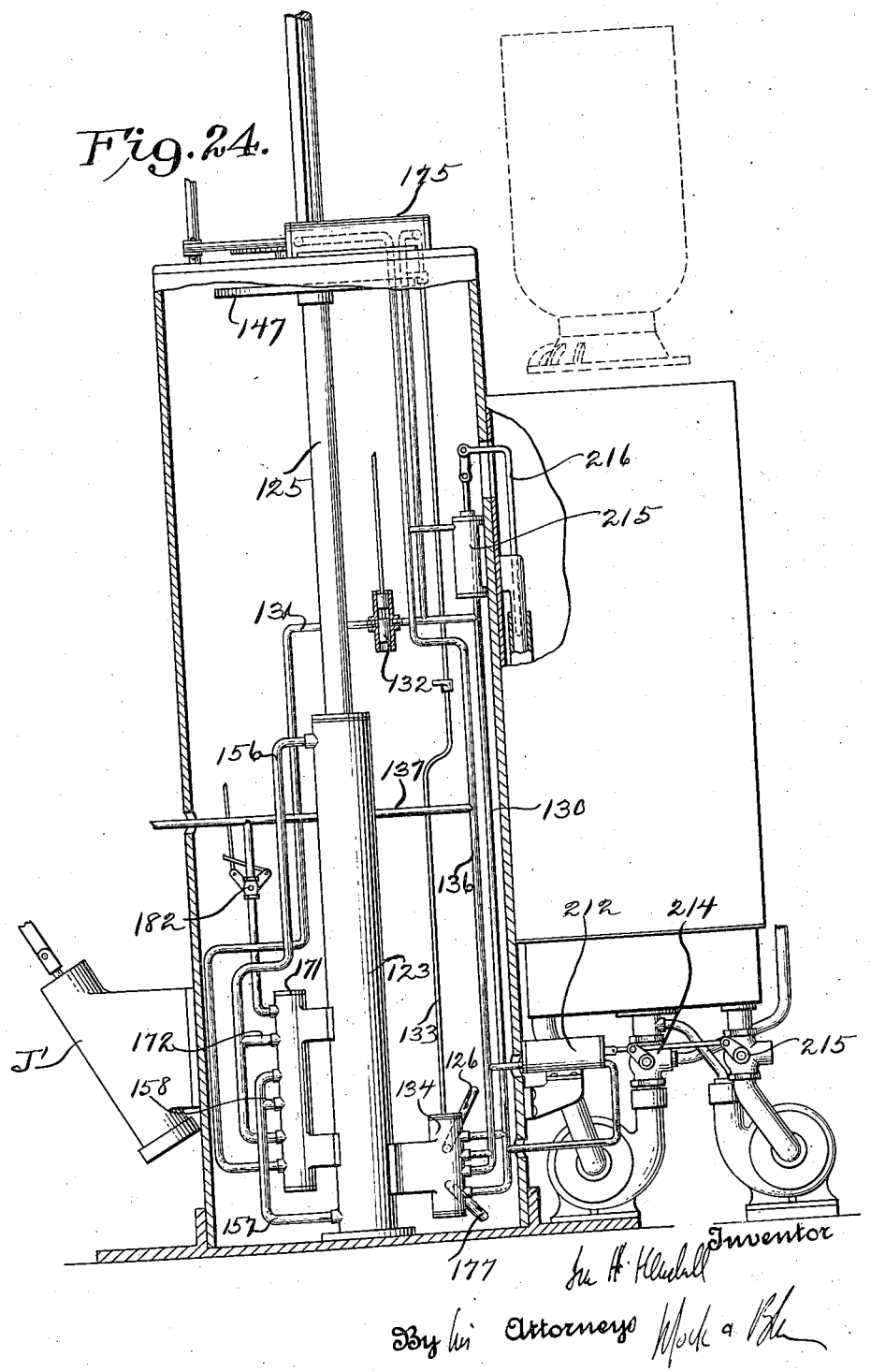
Fig. 24 shows another embodiment of the mechanism for raising and lowering the cans and having a different control apparatus. This form could be substituted for that shown in Fig. 16.

In the embodiment shown in Fig. 24, the various valves, etc., are all controlled by pilot jacks.

As clearly shown in Fig. 16, the valve rod 133 is connected by means of the collar 203 to a link which operates the bell crank lever 204 which controls the same parts and performs the same functions as lever 69 shown in Fig. 3. The various cylinders or tanks are grouped with respect to the turntable as before mentioned and are provided as shown in Fig. 16 with levers 205 connected to links 206 connected to pipes 208 and controlling valve seats 207 similar to the same structure previously shown in Fig. 3 for example, at the right hand side thereof.

The rod 210 cooperates with a series of holes 211 shown in Fig. 15 so as to prevent any turning movement of the turntable while it is moving up and down.

In the embodiment shown in Fig. 24, when the water under pressure passes into pipe 136 it operates the jack 212 which operates the valves in casings 214 and 215 so as to perform the same function as the lever 69 shown in Fig. 3. Similarly when water under pressure enters the pipe 130 it operates the jack 215 so as to lift the rod 216 and accomplish the same result as when the control disc 147 for example, contacts with the lever performing the function of lever 205 in Fig. 16. It will be noted that each one of these pilot jacks like 212 and 215, is provided with both an inlet and an outlet pipe for controlling the movement of the piston therein in both directions. These inlet and outlet pipes are respectively connected to pipes 130 and 136.

Figure 25:
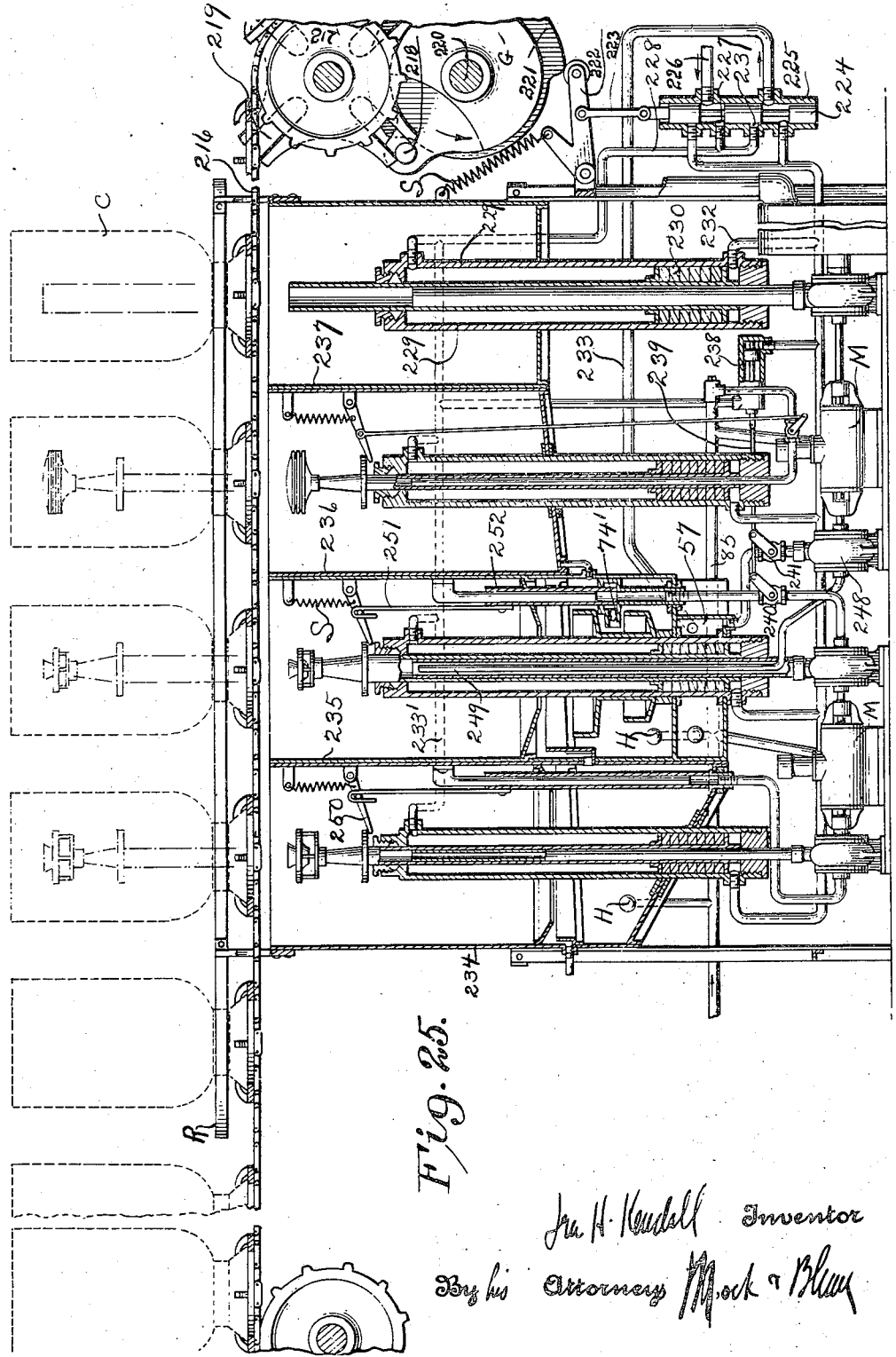
Fig. 25 is a side elevation partially in section of a different embodiment of my invention, embodying another semi-automatic type of machine.

In the last embodiment shown in Fig. 25, the cans are mounted on carriers held upon a chain 216 mounted on sprocket wheels 217 which are intermittently moved by a Geneva stop movement or wheel G having the projection 218 adapted to intermittently engage recesses 219 in the well known manner. The shaft 220 is operated by any suitable motor and it has the cam 221 which periodically depresses the lever 222 having the tension spring S. The lever 222 is connected by means of 223 to the piston valve 224 in casing 225. The valve 224 receives water under pressure through pipe 226. When the lever 222 has been depressed, the water under pressure enters the port 227 and passes through the pipe 228 into the upper parts of the respective jacks 229 so as to depress the pistons 230 and move the various nozzles before mentioned to their lower position.

When the cam 221 is free from the lever 222 the piston valve 224 is moved upwardly so as to close the port 227 and open the port 231 whereby the pistons 230 are upwardly actuated by means of water passing through branch pipes 232. A fresh water tank 57 is provided as before mentioned, and this is connected to the outlet pipe 233. The apparatus in the tank 234 scrubs and cleans the inside of the can. The apparatus in the tank 235 gives it a final washing and rinsing. The apparatus in 236 dries and sterilizes by means of steam and the apparatus in 237 gives it a final treatment with heated air. The rest of the apparatus is substantially the same as before described. A pilot jack 238 is provided and the piston thereof actuates a link 239 connected to the valves in casings 240 and 241. The pipe leading from casing 241 communicates with the fresh water tank 257 so that the pump 248 thereof can spray the pure water through the inner pipe 249 as before mentioned. The pipe leading from the upper part of casing 240 communicates with the interior of the tank 235 by means of pipe 74' as before mentioned and the tank 235 is provided with inner tanks for catching the sand and the like, all as before mentioned.

The various nozzles in their bottom position downwardly move levers 250 having tension spring S and when the nozzles are moved upwardly by their respective jacks, they raise the rods 251 which upwardly move pipes 252 so as to open communication between these tanks and their respective pumps or blowers, all as before mentioned.

Anti-friction means of any suitable type may be provided above the chain 216 so as to guide the cans these anti-friction means have been omitted from the drawings for the sake of clearness because in themselves they are old and well known.

This apparatus can also be used for washing ice cream cans and any other suitable containers.

In the embodiment shown in Fig. 25 it will be noted that in the tank 234 the water which is being circulated is mixed with sand. If this sand would pass between the adjacent and tightly fitting surfaces of the telescopic pipes, it would seriously injure them. However, the upward circulation of the water and sand is continued during the entire movement of the outer telescopic pipe so that the particles of sand as they pass through the pipe always have an upward movement and cannot pass between the pipes. This powerful movement of the water through the telescopic pipes makes it easy to raise the pistons 230.

In the embodiment shown in Fig. 25, where as before mentioned, the cans always remain at the same level, the pipes before mentioned are provided with outer telescopic pipes which can be moved up and down by means of annular pistons 230 located in hydraulic cylinders 229. The top of each hydraulic cylinder is connected to pipe 233' and the bottom of each said hydraulic cylinder is connected to pipe 232. As clearly shown in Fig. 25, the upper pipe 233 communicates by means of port 231 with valve casing 225 having the control valves 225 of a construction similar to that specified and the bottom pipe 232 communicates with a port on top of the said valve casing 225. The water enters under pressure through the pipe 226, and passes out through the pipe 233 to the tank 57 as before mentioned. The wheel G of the shaft 220 has a cam 221 which operates the lever 222 against the tension spring S and the lever 222 is connected by means of the link 223 to the rod of the valve 224. The operation is substantially the same as before mentioned because when the cam 221 depresses the valve 224 the water under pressure enters the pipe 228 connected to the top pipe 233' and forces the pistons 230 downwardly and when the cam 221 releases the lever 222 the spring S moves into the upper position so as to expose the top port of the pipe 232 and this causes the pistons 230 to be raised.

I have shown preferred embodiments of my invention but it is clear that numerous changes and omissions could be made without departing from its spirit.

The jack 175 shown in Fig. 15 is connected at its outlet end opposite the end adjacent the piston shown in Fig. 15 to the pipe 136.

I claim:

1. An apparatus for washing milk cans or other receptacles comprising water-delivery means adapted to deliver a body of water into the can, deflecting means associated with said water-delivery means and adapted to be located within the can to deflect said body of water and cause said body of water to spread out within the can in the form of a flaring sheet moving in a plane inclined to the axis of the can, and means adapted to support and effect a relative movement between said can and said water-delivery means to cause said flaring sheet to sweep along and strike successive portions of the wall of the can.

2. An apparatus for washing milk cans or other receptacles comprising water-delivery means adapted to deliver a moving body of water into the can and means adapted to support and effect a relative movement between said can and said water-delivery means, deflecting means adapted to be located within the can and adapted to cause said body of water to spread out in the form of a substantially continuous conical sheet moving in a direction inclined to the axis of the can so that said spread-out body of water impinges upon the wall of the can in the form of a substantially continuous annular sheet.

3. In an apparatus for washing milk cans or other receptacles, water-delivery means adapted to deliver into the can separated and non-parallel moving substantially conical sheets of water, and means adapted to produce a relative movement between said can and said water-delivery means in a path of sufficient length so that one of said moving sheets of water is caused to constantly impinge on the inner vertical wall of the body of the can and the other sheet of water is caused to impinge upon said inner vertical wall of the body of the can and also upon the inside surface of the bottom of the can said last mentioned sheet of water being caused to impinge upon the inside surface of the bottom of the can when the said water delivery means are sufficiently close to the said inside surface.

4. An apparatus for washing milk cans or other receptacles comprising water-delivery means and means adapted to support and effect a relative movement between said can and the water-delivery means, said water-delivery means being adapted to deliver into the can a substantially continuous sheet of water moving in a direction inclined to the wall of the can and also to the plane of the bottom of the can.

5. An apparatus for washing milk cans or other receptacles comprising water-delivery means and means adapted to support and effect a relative movement between said can and said water-delivery means, said water-delivery means being adapted to deliver into said can three moving bodies of water, one of said bodies being in the form of a column directed towards the bottom of the can, another of said bodies being in the form of a substantially continuous conical sheet moving towards the bottom of the can, and adapted to impinge thereon in the form of a substantially continuous conical sheet and moving towards the wall of the can, the third of said bodies being in the form of a substantially continuous conical sheet moving towards the inlet end of the can.

6. An apparatus for washing milk cans or other receptacles comprising water-delivery apparatus, and means adapted to support a can in inverted position and to effect a relative movement between said water-delivery apparatus and a deflecting shield spaced from the outlet end of said apparatus and adapted to deflect the water issuing therefrom in a direction towards the open bottom of the can.

7. An apparatus according to claim 6 in which the deflecting surface of said shield is concave, and is adapted to deflect the water deflected thereby more than ninety degrees.

8. An apparatus for washing milk cans or other receptacles, comprising a conduit adapted to have a body of water forced through it, and means adapted to support and effect a relative movement between said conduit and said can, a hollow deflecting shield associated with the outlet end of said conduit and adapted to deflect the peripheral portion of said body of water not less than ninety degrees to produce a substantially continuous conical sheet of water directed towards the wall of the can adjacent the inlet end thereof, a second deflecting hollow shield having a mouth of smaller diameter than the mouth of the first shield and adapted to deflect the next peripheral portion of said body of water less than ninety degrees to produce a second substantially continuous conical sheet of water.

9. An apparatus for washing milk cans or other receptacles comprising a conduit adapted to have a body of water forced through it, and actuating means adapted to support and effect a relative movement between the said conduit and said can, a hollow deflecting shield associated with the outlet end of said conduit and adapted to deflect the peripheral portion of said body of water not less than ninety degrees to produce a substantially continuous conical sheet of water directed towards the inner wall of the can adjacent the inlet end thereof, a second deflecting hollow shield having a mouth of smaller diameter than the mouth of the first shield and adapted to deflect the next peripheral portion of said body of water less than ninety degrees to produce a second substantially continuous conical sheet of water, the said actuating means being adapted to vary the distance between the mouth of the said conduit and the inside surface of the bottom of the can so that the second conical sheet of water impinges upon the inner vertical wall of the body of the can while the said inside surface and the mouth of the conduit are in certain spaced relation, the said second sheet of water being caused to impinge upon the inner surface of the bottom of the can when the mouth of the said conduit is sufficiently close to the said inside surface.

10. A machine for cleansing milk cans and other receptacles comprising a turntable mounted on a revoluble shaft, carriers connected to said turntable, a hydraulic jack having a piston connected to said shaft, said jack having an associated cylindrical valve casing, said casing having therein a valve consisting of three piston-like parts fitting in said casing and separated by two intermediate parts of smaller diameter, an inlet pipe communicating with said casing adjacent one of said intermediate parts, an outlet pipe communicating with said casing adjacent the other of said intermediate parts, means adapted to move said valve to and fro, a pipe communicating with the bottom part of the cylinder of said jack and also communicating with said casing by means of two ports controlled by the intermediate piston-like portions of said valve, and a second pipe communicating with the top part of said cylinder and also communicating with said valve casing by means of two ports controlled by the end piston-like parts of said valve.

11. An apparatus for washing milk cans or other receptacles comprising holding means adapted to hold the can, water-delivery means adapted to deliver into the interior of the said can separated and sheet-like bodies of water having different inclinations with respect to the axis of the can and directed towards the bottom of the can, and means adapted to effect a relative movement between the said holding means and the said water delivery means in a direction substantially parallel to the longitudinal axis of the can and in a path of such length that the said body of water having the greatest inclination with respect to the axis of the can is caused to impinge upon the wall of the can during a portion of the said relative movement and the other body of water is caused to constantly impinge upon the bottom of the can.

12. A machine for washing milk cans or other receptacles comprising a first tank having an overflow outlet adapted to control the lever of the water in said tank, said first tank having a first upstanding pipe member therein, means adapted to support and effect a relative movement between a can and the said first pipe member, a second tank associated with said first tank, means adapted to circulate the water in said first tank and to force it upwardly out of said first pipe member, and separate means adapted to force water from said second tank into said first tank through a second pipe member, the outlet of which is above the level of the overflow outlet in the said first tank, the said first tank being free from any means adapted to prevent the water forced out of the second pipe member from freely intermixing with the water in the first tank.

13. In an apparatus for washing milk cans or the like, a tank having a stationary nozzle located therein, means adapted to support a can in inverted position in said tank and over said nozzle and to move said can with respect to said nozzle, and means adapted to force a mixture of water and abrasive material through said nozzle.

14. A machine for cleansing milk cans or the like comprising a conveyor having connected thereto carriers for said milk cans, a support on which said conveyor is mounted, a hydraulic jack having a cylinder and a piston, said piston being connected to said support, control means for said jack adapted to effect a movement of said support, a tank connected to said cylinder and adapted to receive the outlet water from said cylinder, and means associated with said cylinder and adapted to force the outlet water thereof against a can located in said tank.

15. A machine for cleansing milk cans and other receptacles comprising a first tank, a second tank associated with said first tank, said first tank having an overflow outlet, means adapted to supply water to said second tank, a pump having an inlet connected to the first tank adjacent the bottom thereof, said pump having an outlet connected to a pipe extending in said first tank above the level of the overflow outlet thereof, and a second pump having an inlet connected to said second tank and having an outlet connected to a pipe located within and discharging into the first mentioned pipe and means adapted to support and effect a relative movement between a can and said pipes.

16. A machine for cleansing milk cans or other receptacles comprising a tank having an overflow outlet, a pipe located within said tank and having an outlet located above the level of said overflow outlet, a pump having an inlet connected to the bottom part of said tank and having an outlet connected to said pipe, and a deposition receptacle located in said tank adjacent and below the level of said overflow outlet and means adapted to support and effect a relative movement between a can and said pipe.

17. A machine for cleansing milk cans or other receptacles comprising a tank having an overflow outlet, a pipe located within said tank and having an outlet located above the level of said overflow outlet, a pump having an inlet connected to the bottom of said tank and below said overflow outlet, a deposition receptacle located in said tank adjacent and below said overflow outlet and above said pump inlet, and a second deposition receptacle located in said tank below and adjacent to said pump inlet, and means adapted to support and effect a relative movement between a can and said pipe.

18. A machine for cleansing milk cans or the like comprising a conveyor having carriers for said cans, a movable support for said conveyor, operating mechanism adapted to effect the raising and lowering of said conveyor, a control member connected to said conveyor and movable therewith, and connections with said operating mechanism operable by said control member at an end of its path of movement, to render said operating mechanism inoperative.

19. A machine for cleansing milk cans or other receptacles comprising a support having carriers for said cans, operating mechanism connected to said support and adapted to raise and lower the same, a series of tanks located below said support, and means for rendering said operating mechanism inoperative unless said carriers are properly superposed with respect to said tanks.

20. A machine for cleansing milk cans or other receptacles comprising a turntable having carriers for said cans and mounted on a longitudinally movable shaft, a control disc mounted on said shaft, said disc having a series of peripheral recesses therein, operating mechanism connected to said shaft and effective to raise and lower it, a control for said operating mechanism including a rod having a collar thereon, said collar being in the path of movement of the periphery of said disc and being adapted to engage the periphery of said disc intermediate the recesses thereof to actuate said disc, the longitudinal movement of said collar being adapted to actuate said rod to render said operating mechanism inoperative.

21. A machine for cleansing milk cans or other receptacles comprising a vertically movable conveyor having carriers for said cans, operating mechanism adapted to raise and lower said conveyor, a series of tanks into which said carriers are adapted to be lowered, pumps connected to said tanks and adapted to force water therein, and control means operable by the vertical movement of said conveyor to render said pumps inoperative.

22. A machine for cleansing milk cans and other receptacles comprising a conveyor having carriers for said cans, said conveyor being mounted on a support adapted to be moved up and down, a hydraulic jack having a cylinder and a piston, said piston being connected to said support, a control valve associated with said jack and adapted to control the supply of liquid under pressure to either end of said cylinder, a manual control for said valve, and an automatic control for said valve operable by said support to move said valve into a position in which the water supply to said jack is shut off.

In testimony whereof I hereunto affix my signature.

IRA H. KENDALL.